United States Patent [19]

Claar et al.

[11] Patent Number: 5,242,710
[45] Date of Patent: Sep. 7, 1993

[54] METHODS FOR MAKING SELF-SUPPORTING COMPOSITE BODIES AND ARTICLES PRODUCED THEREBY

[75] Inventors: Terry D. Claar, Newark; Vilupanur A. Ravi, New Castle; Philip J. Roach, Newark, all of Del.

[73] Assignee: Lanxide Technology Company, LP, Newark, Del.

[21] Appl. No.: 880,479

[22] Filed: May 6, 1992

Related U.S. Application Data

[63] Continuation of Ser. No. 543,316, Jun. 25, 1990, abandoned.

[51] Int. Cl.$^5$ ................................. C23C 16/00
[52] U.S. Cl. ......................... 427/248.1; 427/249; 427/255.4; 501/87
[58] Field of Search ............ 427/249, 248.1, 255.4; 501/87, 96, 102, 134; 419/12, 14

[56] References Cited

U.S. PATENT DOCUMENTS

| | | | |
|---|---|---|---|
| 1,948,382 | 2/1934 | Johnson | 201/75 |
| 2,512,230 | 6/1950 | Greaves et al. | 154/75 |
| 2,597,964 | 5/1952 | Winter | 428/307.7 |
| 2,910,379 | 10/1959 | Gurinsky | 427/5 |
| 2,929,741 | 3/1960 | Steinberg | 427/249 |
| 2,972,556 | 2/1961 | Vrahiotes et al. | 117/106 |
| 3,019,128 | 1/1962 | Smiley | 428/420 |
| 3,095,316 | 6/1963 | Hartwig | 428/408 |
| 3,230,110 | 1/1962 | Smith | 117/228 |
| 3,348,967 | 10/1967 | Hucke | 427/399 |
| 3,778,300 | 12/1973 | Wohlberg | 427/350 |
| 3,925,577 | 12/1975 | Fatzer et al. | 427/249 |
| 4,024,294 | 5/1977 | Rairden, III | 427/250 |
| 4,196,233 | 4/1980 | Bitzer et al. | 427/249 |
| 4,459,328 | 7/1984 | Mizuhara | 427/192 |
| 4,472,476 | 9/1984 | Veltri et al. | 428/215 |
| 4,686,117 | 8/1987 | Arai et al. | 427/249 |
| 4,777,014 | 10/1988 | Newkirk et al. | 419/12 |
| 4,882,306 | 11/1989 | Kennedy et al. | 501/87 |
| 4,921,725 | 5/1990 | Bouix | 427/45.1 |

FOREIGN PATENT DOCUMENTS 0261053 3/1988 European Pat. Off.
0322336 6/1989 European Pat. Off.

OTHER PUBLICATIONS

Y. Isobe, Y. Yazawa, P. Son and M. Miyake, "Chemically Vapour-Deposited Mo/Re Double-Layer Coating on Graphite at Elevated Temperatures", Journal of Less-Common Metals, pp. 239-250, vol. 152, 1989, Elsevier Sequoai, The Netherlands.

Primary Examiner—Roy King
Attorney, Agent, or Firm—Mark G. Mortenson; Stanislav Antolin

[57] ABSTRACT

This invention relates generally to a novel directed metal oxidation process which is utilized to produce self-supporting bodies. In some of the more specific aspects of the invention, a parent metal vapor is induced to react with a solid oxidant to result in the directed growth of a reaction product which is formed from a reaction between the parent metal vapor and the solid oxidant. The inventive process can be utilized to form bodies having substantially homogeneous compositions, graded compositions, and macrocomposite bodies.

27 Claims, 26 Drawing Sheets

METHODS FOR MAKING SELF-SUPPORTING COMPOSITE BODIES AND ARTICLES PRODUCED THEREBY

This is a continuation of copending application Ser. No. 07/543,316 filed on Jun. 25, 1990, now abandoned.

FIELD OF THE INVENTION

This invention relates generally to a novel directed metal oxidation process which is utilized to produce self-supporting bodies. In some of the more specific aspects of the invention, a parent metal vapor is induced to react with a solid oxidant to result in the directed growth of a reaction product which is formed from a reaction between the parent metal vapor and the solid oxidant. The inventive process can be utilized to form bodies having substantially homogeneous compositions, graded compositions, and macrocomposite bodies.

BACKGROUND OF THE PRESENT INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of metal boride and metal carbide bodies by the methods of hot pressing, reaction sintering, and reaction hot pressing is well known. While there has been some limited success in producing metal boride and metal carbide bodies according to the above-discussed methods, there is still a need for a more effective and economical method to prepare such bodies.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare dense boride-containing materials.

Moreover, there also has been significant interest in modifying the properties of known or existing materials in a manner which renders the materials suitable for use in environments which normally would adversely affect such materials. For example, one such modifying approach generally relates to coating onto a surface of a substrate material a second materials, which has properties which differ from the underlying substrate material.

Various methods exist for coating substrate materials. A first category of coating processes is generally referred to as overlay coatings. Overlay coatings involve, typically, a physical deposition of a coating material onto a substrate. The coating material typically enhances the performance of the substrate by, for example, increasing the erosion resistance, corrosion resistance, high temperature strength, etc., of the substrate material. These overlay coatings typically result in the substrate material having longer life and/or permit the use of the substrate material in a number of environments which normally might adversely affect and/or destroy the utility of the substrate material absent the placement of the overlay coating thereon.

Commonly utilized overlay coating methods include Chemical Vapor Deposition, Hot Spraying, Physical Vapor Deposition, etc. Briefly, Chemical Vapor Deposition utilizes a chemical process which occurs between gaseous compounds when such compounds are heated. Chemical Vapor Deposition will occur so long as the chemical reaction produces a solid material which is the product of the reaction between the gaseous compounds. The Chemical Vapor Deposition process is typically carried out in a reaction chamber into which both a reactive gas and a carrier gas are introduced. A substrate material is placed into contact with the reactant and carrier gases so that reaction between the gases and deposition of the reaction solid will occur on the surface of the substrate. Chemical Vapor Deposition processes typically involve the use of alkali gases (e.g., chlorides, fluorides, etc.) in the reaction chamber which can be quite corrosive and must be carefully handled. Accordingly, even though Chemical Vapor Deposition processes may produce desirable coatings on some materials, the equipment that is utilized typically is complicated in design and expensive to operate.

A number of Hot Spraying techniques also exists for the placement of an overlay coating on a substrate material. The three most widely utilized Hot Spraying techniques include Flame Spraying, Plasma Spraying, and Detonation Coating.

Flame Spraying utilizes a fine powder which is contained in a gaseous stream and which is passed through a combustion flame which renders the fine powder molten. The molten powder is then caused to impinge on a surface of a substrate material which is to be coated, which is typically cold relative to the flame spray. Bonding of the coating of flame-sprayed material to the substrate is primarily of a mechanical nature. The flame-sprayed coating is usually not fully dense and thus is often subsequently treated by a fusing operation to densify the coating.

Plasma Spraying is somewhat similar to Flame Spraying, except that the fine powder, instead of being passed through an intense combustion flame, is passed through an electrical plasma which is produced by a low voltage, high current electrical discharge. As a result, disassociation and ionization of gases occur which results in a high temperature plasma. The high temperature plasma is directed toward a substrate material resulting in the deposition of a layer of coating material on the substrate.

Detonation Coating is a process which has some similarities to Flame Spraying, except that a desired amount of powder is directed at high velocity (e.g., about 800 meters per second) toward the surface of a substrate material which is to be coated. While the particles are being accelerated in a hot gas stream, the particles melt. Moreover, the high kinetic energy of the particles when impinging on the surface of a substrate material results in additional heat being generated, thereby assisting the coating process.

The third category of so-called overlay coatings is Physical Vapor Deposition coatings. Physical Vapor Deposition coatings include, for example, Ion Sputtering, Ion Plating, and Thermal Evaporation.

In Ion Sputtering, a vacuum chamber houses a cathode electrode such that the cathode electrode emits atoms and atomic clusters toward a substrate material to result in a sputtered film or coating being deposited on the substrate.

Ion Plating of a substrate material involves the use of a heated metal source which emits metal atoms toward a substrate material which is to be coated. Specifically, an electron beam is typically utilized to excite the metal atoms from the metal source. The excited metal atoms are then directed toward the substrate material to be coated.

Thermal Evaporation also relies on the excitation of atoms from a metal source. Specifically, in a vacuum chamber, a metal source is heated so that metal atoms evaporate from the metal source and are directed toward a substrate material to be coated. The metal atoms then collect as a coating on the substrate.

A second general category of coating formation techniques is known as conversion coating techniques. In conversion coating techniques, a substrate material, typically, is involved in a chemical reaction which modifies the composition and/or microstructure of the surface of the substrate. These conversion coating techniques also can result in desirable surface modification of substrate materials. Typical examples of conversion coating techniques include Pack Cementation and Slurry Cementation.

Pack Cementation and Slurry Cementation utilize diffusion of one or more materials to form a surface coating. Specifically, in each of these processes, a substrate material is contacted with a metal source material such that a metal from the metal source material may diffuse into the substrate material and/or a component of the substrate material may diffuse toward the metal source material. Specifically, for example, in Pack Cementation, a substrate material is buried within a powder mixture which comprises, typically, both a metal which is to react with the substrate material and an inert material. A carrier gas is then induced to flow into the powder mixture so that the carrier gas can carry metal atoms from the metal powder to the surface of the substrate and deposit the metal atoms thereon. Both Pack Cementation and Slurry Cementation typically occur in a retort or vacuum furnace and the carrier gas is free to transport metal atoms from the metal powder to the surface of the substrate material. Typical carrier gases include the halogen gases. Many different approaches to Pack Cementation have been made, however, most of these approaches utilize the above-discussed steps.

Slurry Cementation is quite similar to Pack Cementation, however, in Slurry Cementation, a composition typically is coated onto a surface of a substrate material prior to conducting the diffusion process in a vacuum or retort furnace. In each of Pack Cementation and Slurry Cementation, the temperature of reaction is typically elevated to permit the metal atoms to react with the substrate by solid state diffusion which results in the formation of a coating material.

The above-discussed coating techniques have been briefly addressed herein to give the reader a general understanding of the art. However, it should be understood that many specific variations to the above-discussed techniques exist. Specifically, each of the coating processes discussed above has been discussed in detail in a number of readily available sources, including textbooks, conference proceedings, and patents. For further information relating to the detail of these processes, the reader is encouraged to consult the literature referred to above. However, even from the brief discussion above, it is clear that each of the techniques suffers from various limitations. For example, in the overlay coating techniques, the physical deposition of a coating onto a substrate material does not insure an acceptable interface between the substrate and the coating. Specifically, because most of the overlay coating techniques simply rely on the use of a physical bonding between the coating and the substrate, the coating may not adhere to the substrate in a desirable manner. Accordingly, the purpose of the coating may be comprised completely. Additionally, all of the overlay coating processes depend on the use of somewhat complex deposition equipment. For example, Chemical Vapor Deposition requires the use of complicated control means for controlling the rate of flow of reactive and carrier gases in a reaction chamber, the ability to handle corrosive alkali gases (e.g., fluorides and chlorides). Accordingly, the equipment utilized for Chemical Vapor Deposition is typically quite expensive.

Moreover, with regard to the so-called conversion coating techniques which are formed by, for example, Pack Cementation and Slurry Cementation techniques, the coatings which result on substrate materials may not be uniform due to the inclusion of solid materials or porosity which result from exposure of the substrate to either or both the powder metal source and/or inert materials utilized in the Pack Cementation or Slurry Cementation processes. Still further, many of the Pack Cementation and Slurry Cementation techniques may require the use of somewhat complex equipment.

The present invention is a significant improvement over all known prior art techniques in that relatively simple equipment can be utilized to achieve a virtually infinite combination of desirable bodies. Specifically, the present invention permits the formation of a coating on substrate materials or the creation of new materials from, for example, solid oxidant precursor materials. The coatings which form are very dense and are substantially uniform in thickness. Additionally, the coatings can be applied in thicknesses heretofore believed difficult, if not impossible to achieve. Moreover, due to the simplicity of the process and, for example, the rate of conversion of a solid oxidant material to a reaction product, entire solid oxidant bodies can be converted from one composition to another. These and other aspects of the invention will become apparent to those skilled in the art when reading the following sections.

DISCUSSION OF RELATED PATENT APPLICATIONS

A directed metal oxidation reaction is disclosed in U.S. Pat. No. 4,713,360, which issued on Dec. 15, 1987, and is entitled "Novel Ceramic Materials and Methods for Making Same" and which was issued in the names of Marc S. Newkirk et al. This patent discloses that a molten parent metal can react with a vapor-phase oxidant and result in the directed growth of an oxidation reaction product.

A similar directed metal oxidation reaction process is disclosed in U.S. Pat. No. 4,851,375, which issued on Jul. 25, 1989, and is entitled "Methods of Making Composite Ceramic Articles Having Embedded Filler", and which issued in the names of Marc S. Newkirk et al. This patent discloses that a molten parent metal can react with an oxidant to grow oxidation reaction product into a substantially inert filler material, thereby forming a ceramic matrix composite body.

The reactive infiltration into a bed or mass comprising boron carbide is discussed in U.S. Pat. No. 5,017,334, which issued on May 21 1991, from U.S. patent application Ser. No. 07/446,433, filed in the names of Terry Dennis Claar et al., on Dec. 5, 1989, now U.S. Pat. No. 5,017,334, and entitled "A Process For Preparing Self-Supporting Bodies and Products Produced Thereby", which is a continuation of U.S. Pat. No. 4,885,130, which issued on Dec. 5, 1989, in the names of Terry Dennis Claar et al., and is entitled "Process For Preparing Self-Supporting Bodies and Products Produced Thereby", which in turn is a continuation-in-part application of U.S. Pat. No. 4,940,679, which issued on Jul. 10, 1990, from U.S. patent application Ser. No. 07/137,044, filed on Dec. 23, 1987, now U.S. Pat. No. 4,940,679, in the names of Terry Dennis Claar et al., and entitled "Process For Preparing Self-Supporting Bodies and Products Made Thereby", and which was allowed on Jan. 2, 1990, which in turn is a continuation-in-part Application of U.S. patent application Ser. No. 07/073,533 (now abandoned), filed in the names of Danny R. White, Michael K. Aghajanian and T. Dennis Claar, on Jul. 15, 1987, and entitled "Process for Preparing Self-Supporting Bodies and Products Made Thereby".

Briefly summarizing the disclosure contained in each of the above-identified patent applications and issued Patent relating to reactive infiltration, self-supporting ceramic bodies are produced by utilizing a parent metal infiltration and reaction process (i.e., reactive infiltration) in the presence of a mass comprising boron carbide. Particularly, a bed or mass comprising boron carbide is infiltrated by molten parent metal, and the bed may be comprised entirely of boron carbide, thus resulting in a self-supporting body comprising one or more parent metal boron-containing compounds, which compounds include a parent metal boride or a parent metal boron carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of each of the above-identified reaction infiltration patent applications and issued Patent, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming a parent metal boron-containing compound (e.g., a parent metal boride and/or boron compound under the temperature conditions of the process). Typically, a parent metal carbide is also produced, and in certain cases, a parent metal boron carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boron carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boron compound, a parent metal carbide, a metal (which, as discussed in each of the above-identified patent applications and issued Patent, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boron compound(s) and parent metal carbide is at least about 50%, and most preferably at least about 90%.

The typical environment or atmosphere which was utilized in each of the above-identified patent applications and issued Patent was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boron carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Moreover, co-pending U.S. patent application Ser. No. 07/137,044 (discussed above and hereinafter referred to as "Application '044"), discloses that in some cases it may be desirable to add a carbon donor material (i.e., a carbon-containing compound) to the bed or mass comprising a boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

Still further, Issued U.S. Pat. No. 4,885,130 (discussed above and hereinafter referred to as "Patent '130"), discloses that in some cases it may be desirable to add a boron donor material (e.g., a boron-containing compound) to a bed or mass of boron carbide which is to be infiltrated by molten parent metal. The added boron-containing compound can then behave in a manner similar to the carbon-containing compound discussed above in relation to Application '044, except that the ratio of $ZrB_2/ZrC$ could be increased, as opposed to reduced.

Still further, U.S. Pat. No. 4,904,446, which issued on Feb. 27, 1990, in the names of Danny Ray White and Terry Dennis Claar and entitled "Process For Preparing Self-Supporting Bodies and Products Made Thereby", discloses that a parent metal can react with a mass comprising boron nitride to result in a body comprising a boron-containing compound, a nitrogen-containing compound and, if desired, a metal. The mass comprising boron nitride may also contain one or more inert fillers. Relative amounts of reactants and process conditions may be altered or controlled to yield a body containing a varying volume percents of ceramic, metal and/or porosity.

Moreover, U.S. Pat. No. 5,019,539, which issued on May 29, 1991, from U.S. patent application Ser. No. 07/296,961, which was filed on Jan. 13, 1989, now U.S. Pat. No. 5,019,539, in the names of Terry Dennis Claar et al., and entitled "A Process for Preparing Self-Supporting Bodies Having Controlled Porosity and Graded Properties and Products Produced Thereby", and which was allowed on Feb. 27, 1990, discloses that a powdered parent metal can be mixed with a bed or mass comprising boron carbide and, optionally, one or more inert fillers, to form a self-supporting body. The application also discloses that the properties of a composite body can be modified by, for example, tailoring the porosity by appropriate selection of the size and/or composition of the parent metal powder or particulate, etc., which is mixed with the boron carbide.

The disclosures of each of the above-discussed Commonly Owned U.S. Patents and U.S. patent applications are herein expressly incorporated by reference.

SUMMARY OF THE INVENTION

In accordance with the present invention, there are provided a plurality of methods for producing self-supporting bodies. Specifically, a vapor-phase parent metal is caused to react with a solid oxidant to form a solid reaction product.

In all embodiments of the invention, the following processing steps are utilized. A material, at least a portion of which comprises a solid oxidant, is placed into a reaction chamber. The reaction chamber should be made of, or at least coated with, a material which does not adversely react with any of the materials utilized in the process of the present invention. Moreover, the reaction chamber should be capable of isolating all materials contained therein from any external contaminants which might adversely impact the process of the present invention. A vapor-phase parent metal source is contained within the reaction chamber in a manner which permits an interaction between the parent metal vapor and the solid oxidant-containing material. The parent metal vapor can be introduced by providing a solid source of parent metal within the reaction chamber, or contiguous to the reaction chamber, and heating the solid source of parent metal until a temperature is achieved which results in an adequate vapor pressure of the parent metal being present in the reaction chamber. The parent metal vapor should be capable of contacting that portion of the solid oxidant-containing material which is to react with the parent metal vapor. Accordingly, only a portion of a solid oxidant-containing material may be exposed to the parent metal vapor to create a reaction product or alternatively, substantially all of a solid oxidant-containing material can be exposed to a parent metal vapor to create reaction product.

The solid oxidant-containing material which is to react with the parent metal vapor should be, or contain, a material which is itself capable of reacting with the parent metal vapor to form reaction product, or should be capable of being coated with a material which contains a solid oxidant which is capable of forming a desirable reaction product when contacted with a parent metal vapor.

In a first preferred embodiment of the invention, a solid oxidant-containing material is comprised substantially completely of solid oxidant which is capable of reacting with parent metal vapor under the process conditions of the invention. Accordingly, for example, a carbonaceous material is placed within a reaction chamber and is placed into contact with parent metal vapor (e.g., titanium, hafnium, and/or zirconium) to result in the formation of a parent metal carbide reaction product. The amount of reaction product that can form includes: (1) a relatively thin layer of reaction product formed upon a carbonaceous substrate material, (2) a relatively thick layer of reaction product formed upon a carbonaceous substrate material, or (3) substantially complete conversion of the substrate material to reaction product.

In a second preferred embodiment of the invention, a composite material can be formed. Specifically, a solid oxidant substrate is first coated with a substantially inert filler material prior to being exposed to a parent metal vapor. A reaction product of parent metal vapor and solid oxidant is then formed and the substantially inert filler material is thereafter embedded in the formed reaction product, thereby forming a composite material. The filler material may comprise any particular shape or combination of shapes of filler material, and may have any suitable chemical constituancy. However, the filler material should be chosen so as to be capable of surviving the process of the present invention. Moreover, by appropriate selection of filler material(s) to be embedded by reaction product, a wide range of desirable properties can be achieved.

In a third preferred embodiment of the invention, a solid oxidant-containing substrate material is first coated or contacted with at least one material which will react with at least one other material external to the solid oxidant (e.g., in the coating), and/or react with at least one material in the solid oxidant containing material and/or, react with the parent metal vapor. For example, a powdered parent metal having a substantially similar or substantially different composition from the parent metal vapor, may be first placed as a coating onto at least a portion of a surface of a solid oxidant-containing material prior to the parent metal vapor contacting the solid oxidant-containing material. Reactions may then occur between the powdered parent metal on the surface of the solid oxidant-containing material and the solid oxidant itself and/or reactions may occur between the powdered parent metal on the solid oxidant-containing material and the parent metal vapor. Additionally, at least one solid oxidant (e.g., boron carbide) which is different in composition from the solid oxidant-containing substrate material (e.g., carbon) may be placed onto the surface of the solid oxidant-containing material prior to contacting the parent metal vapor with the solid oxidant-containing material. The different solid oxidant placed on the surface of a solid oxidant-containing material substrate should be capable of reacting with the parent metal vapor to result in a reaction product which is different than the reaction product which results when the parent metal vapor reacts with the substrate solid oxidant-containing material. This different reaction product could serve as a filler material. Still further, a powdered parent metal (e.g., titanium, hafnium, and/or zirconium) having a substantially similar or substantially different chemical composition from the parent metal vapor (e.g., titanium, hafnium, and/or zirconium) may be mixed with a solid oxidant powder which is different in composition from the solid oxidant-containing material substrate to permit the formation of a reaction product which is different than the reaction product which forms when the parent metal vapor contacts the substrate solid oxidant-containing material. This different reaction product could also serve as a filler material.

In a fourth preferred embodiment of the invention, each of the first and third embodiments discussed above can be expanded on by positioning a filler material on at least a portion of the surface of the solid oxidant-containing material. Accordingly, the filler material could be uniformly or non-homogeneously mixed with, for example, a powdered parent metal of substantially similar or substantially different composition than the vapor-phase parent metal. Moreover, the filler material could be mixed in a substantially uniform or non-homogeneous manner with a solid oxidant powder which is placed onto the surface of a solid oxidant-containing substrate material. Still further, a filler material may be mixed either substantially uniformly or non-homogeneously with the combination of a parent metal powder (having a substantially similar or substantially different composition than a parent metal vapor) and a solid oxidant.

In a fifth preferred embodiment of the invention, a solid oxidant-containing material is placed as a coating on a substrate material which normally would not react with a parent metal vapor so as to permit the formation of a reaction product coating having a composition different than the solid oxidant-containing material coating and the substrate material.

It should be understood that a large number of combinations of parent metal vapors, solid oxidant-containing materials, solid oxidant powders, parent metal powders, etc., are possible for utilization in accordance with the teachings of the present invention. Thus, while every potential combination of materials has not been expressly discussed above herein, such combinations should readily occur to those skilled in the art.

DEFINITIONS

As used herein in the specification and the appended claims, the terms below are defined as follows:

"Different" as used herein in conjunction with chemical compositions, means that a primary chemical constituent of one material differs from a primary chemical constituent of another referenced material.

"Filler" as used herein, means either single constituents or mixtures of constituents which are substantially non-reactive with, and/or of limited solubility in, parent metal powders and/or parent metal vapors and may be single or multi-phase. Fillers may be provided in a wide variety of forms such as powders, flakes, platlets, microspheres, whiskers, bubbles, etc., and may be dense or porous. "Fillers" may also include ceramic fillers, such as alumina, or silicon carbide as fibers, particulates, whiskers, bubbles, spheres, fibermats, or the like, and ceramic-coated fillers such as carbon fibers coated with alumina or silicon carbide to protect the carbon from attack. "Fillers" may also include metals. "Fillers" should also be capable of surviving the processing conditions.

"Parent Metal Powder" as used herein, means that metal (e.g., zirconium, titanium, hafnium, etc.) which is the precursor for a reaction product of the powdered parent metal and a solid oxidant (e.g., parent metal carbides, etc.) and includes that metal as a pure or relatively pure metal, a commercially available metal having impurities and/or alloying constituents therein and an alloy in which that metal precursor is the major constituent. When a specific metal is mentioned as the powdered parent metal, the metal identified should be read with this definition in mind unless indicated otherwise by the context.

"Parent Metal Vapor" or "Vapor-Phase Parent Metal" as used herein, means that metal (e.g., zirconium, titanium, hafnium) which is the vapor-phase precursor for the reaction product (e.g., parent metal carbides, etc.) of the parent metal and a solid oxidant and includes that metal as a pure or relatively pure metal, a commercially available metal having impurities and/or alloying constituents therein and an alloy in which that metal precursor is the major constituent. When a specific metal is mentioned as the powdered parent metal, the metal identified should be read with this definition in mind unless indicated otherwise by the context.

"Parent Metal Boride" and "Parent Metal Boro Compounds" as used herein, means a reaction product containing boron formed upon reaction between a boron source material and at least one parent metal source (either vapor-phase or solid phase) and includes a binary compound of boron with the parent metal, as well as ternary or higher order compounds.

"Parent Metal Carbide" as used herein, means a reaction product containing carbon formed upon reaction of a solid oxidant carbon source and a parent metal.

"Parent Metal Nitride" as used herein, means a reaction product containing nitrogen formed upon reaction of a nitrogen source (e.g., boron nitride) and a parent metal.

"Reaction Product" as used herein, means the product which forms as a result of the reaction between a parent metal and a solid oxidant.

"Solid Oxidant" as used herein, means an oxidant in which the identified solid is the sole, predominant, or at least a significant oxidizer of the parent metal vapor under the conditions of the process.

"Solid Oxidant-Containing Material" as used herein, means a material which contains a solid oxidant. The solid oxidant may comprise substantially all of the material or may comprise only a portion of the material. The solid oxidant may be substantially homogeneously or heterogeneously located within the material.

"Solid Oxidant Powder" as used herein, means an oxidant in which the identified solid is the sole, predominant, or at least a significant oxidizer of a parent metal powder and/or parent metal vapor and which is located on at least a portion of a surface of another material (e.g., a solid oxidant-containing material).

DETAILED DESCRIPTION OF THE INVENTION AND PREFERRED EMBODIMENTS

Figure 1:
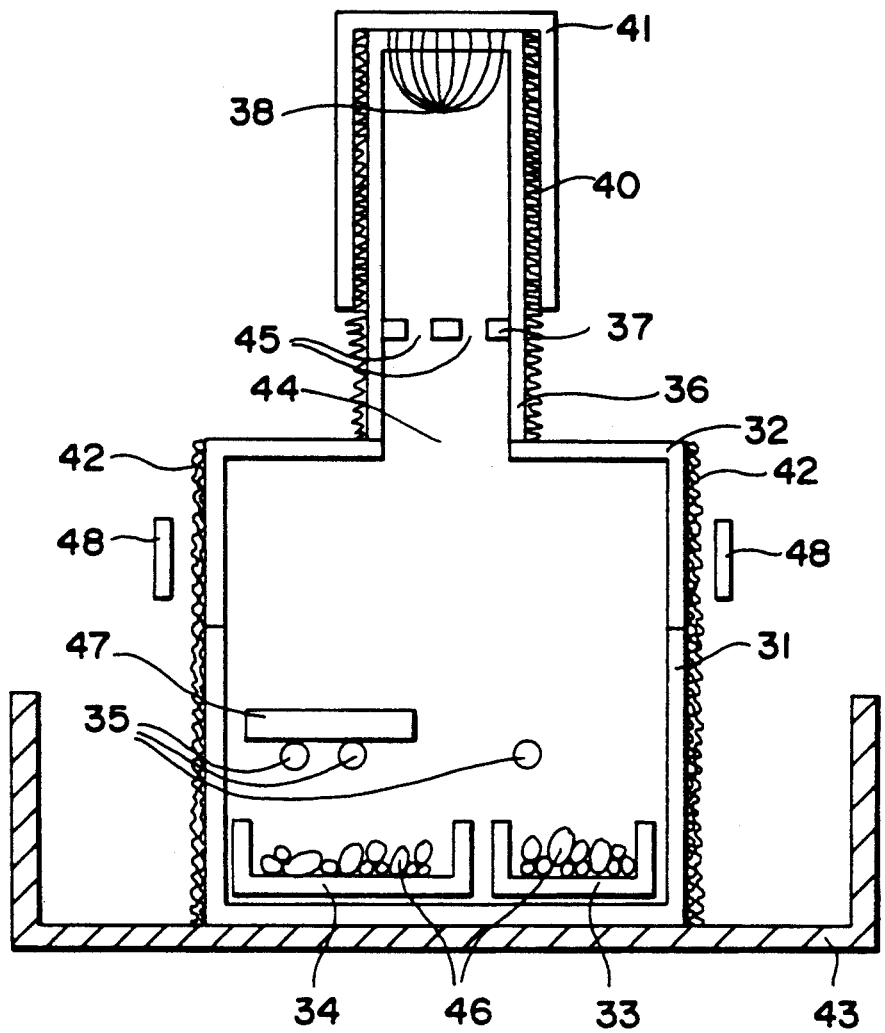
FIG. 1 is a schematic cross-sectional view of an assembly utilized to produce a body in accordance with the present invention.

In accordance with the present invention, there are provided a plurality of methods for producing self-supporting bodies. Specifically, a vapor-phase parent metal is caused to react with a solid oxidant to form a solid reaction product.

In all embodiments of the invention, the following processing steps are utilized. A material, at least a portion of which comprises a solid oxidant, is placed into a reaction chamber. The reaction chamber should be made of, or at least coated with, a material which does not adversely react with any of the materials utilized in the process of the present invention. Moreover, the reaction chamber should be capable of isolating all materials contained therein from any external contaminants which might adversely impact the process of the present invention. A vapor-phase parent metal source is contained within the reaction chamber in a manner which permits an interaction between the parent metal vapor and the solid oxidant-containing material. The parent metal vapor can be introduced by providing a solid source of parent metal within the reaction chamber, or contiguous to the reaction chamber, and heating the solid source of parent metal until a temperature is achieved which results in an adequate vapor pressure of the parent metal being present in the reaction chamber. The parent metal vapor should be capable of contacting that portion of the solid oxidant-containing material which is to react with the parent metal vapor. Accordingly, only a portion of a solid oxidant-containing material may be exposed to the parent metal vapor to create a reaction product or alternatively, substantially all of a solid oxidant-containing material can be exposed to a parent metal vapor to create reaction product.

The solid oxidant-containing material which is to react with the parent metal vapor should be, or contain, a material which is itself capable of reacting with the parent metal vapor to form reaction product, or should be capable of being coated with a material which contains a solid oxidant which is capable of forming a desirable reaction product when contacted with a parent metal vapor.

For example, a category of materials which have been given a substantial amount of attention for many high temperature applications is the graphite or carbonaceous materials. Specifically, carbon-based materials (e.g., carbon/carbon composites, solid forms of graphite, etc.) have achieved a substantial amount of attention because they are relatively light in weight, have excellent high temperature properties, are thermal shock resistant, and have desirable electrical properties. However, the use of carbon-based materials for many applications has been limited due to the poor oxidation and/or erosion (e.g., abrasion) resistance inherent to these materials. Thus, many approaches for forming some type of protective coating on carbon-based materials have been attempted. The techniques of the present invention are well suited for coating carbon-based materials and/or substantially completely converting carbon-based materials to another material (e.g., a ceramic or ceramic composite material) which may be more desirable for a particular purpose or application. This disclosure will focus primarily upon methods for parent metals reacting with carbon-based materials, however, it should be understood that the present invention can be utilized with materials other than graphite or carbon-based materials.

In an effort to explain the workings of the present invention, but without wishing to be bound by any particular theory or explanation for the present invention, it appears as though when a parent metal vapor contacts a solid oxidant, the parent metal vapor first is absorbed onto a surface of a solid oxidant-containing material until a substantially uniform, but very thin, layer is formed. The formed layer eventually substantially completely isolates the solid oxidant from any further direct physical contact with the parent metal vapor. Thus, for reaction product to form, additional atoms or ions of parent metal should be capable of diffusing through the formed layer and/or, at least one species in the solid oxidant-containing material should be capable of diffusing in an opposite direction toward the parent metal vapor through the same formed layer, to permit additional reaction to occur. The respective rates of diffusion of parent metal ions and solid oxidant through the formed layer will directly impact the nature and properties of the composite body which is formed. Stated more specifically, a directed metal oxidation reaction will occur when the rate of diffusion of the solid oxidant through the formed layer is greater than the rate of diffusion of parent metal ions through the formed layer thus, resulting in a build-up or layer of material on a surface of a solid oxidant-containing material. By controlling various processing parameters such as parent metal composition, parent metal vapor pressure, solid oxidant composition, location of solid oxidant within or on another substantially non-reactive material, temperature, processing time, etc., the resulting composite body may comprise anything from a substrate solid oxidant-containing material having at least one portion of its surface covered with reaction product, to a substantially completely converted solid oxidant-containing material (e.g., carbon being converted to titanium carbide).

In a first preferred embodiment of the invention, a solid oxidant-containing material is comprised substantially completely of solid oxidant which is capable of reacting with parent metal vapor under the process conditions of the invention. Accordingly, for example, a carbonaceous material is placed within a reaction chamber and is placed into contact with parent metal vapor (e.g., titanium, hafnium, and/or zirconium) to result in the formation of a parent metal carbide reaction product. The amount of reaction product that can form includes: (1) a relatively thin layer of reaction product formed upon a carbonaceous substrate material, (2) a relatively thick layer of reaction product formed upon a carbonaceous substrate material, or (3) substantially complete conversion of the substrate material to reaction product.

In a second preferred embodiment of the invention, a composite material can be formed. Specifically, a solid oxidant substrate is first coated with a substantially inert filler material prior to being exposed to a parent metal vapor. A reaction product of parent metal vapor and solid oxidant is then formed and the substantially inert filler material is thereafter embedded in the formed reaction product, thereby forming a composite material. The filler material may comprise an particular shape or combination of shapes of filler material, and may have any suitable chemical constituancy. However, the filler material should be chosen so as to be capable of surviving the process of the present invention. Moreover, by appropriate selection of filler material(s) to be embedded by reaction product, a wide range of desirable properties can be achieved.

In a third preferred embodiment of the invention, a solid oxidant-containing substrate material is first coated or contacted with at least one material which will react with at least one other material external to the solid oxidant (e.g., in the coating), and/or react with at least one material in the solid oxidant containing material, and/or react with the parent metal vapor. For example, a powdered parent metal having a substantially similar or substantially different composition from the parent metal vapor, may be first placed as a coating onto at least a portion of a surface of a solid oxidant-containing material prior to the parent metal vapor contacting the solid oxidant-containing material. Reactions may then occur between the powdered parent metal on the surface of the solid oxidant-containing material and the solid oxidant itself and/or reactions may occur between the powdered parent metal on the solid oxidant-containing material and the parent metal vapor. Additionally, at least one solid oxidant (e.g., boron carbide) which is different in composition from the solid oxidant-containing substrate material (e.g., carbon) may be placed onto the surface of the solid oxidant-containing material prior to contacting the parent metal vapor with the solid oxidant-containing material. The different solid oxidant placed on the surface of a solid oxidant-containing material substrate should be capable of reacting with the parent metal vapor to result in a reaction product which is different than the reaction product which results when the parent metal vapor reacts with the substrate solid oxidant-containing material. This different reaction product could serve as a filler material. Still further, a powdered parent metal (e.g., titanium, hafnium, and/or zirconium) having a substantially similar or substantially different chemical composition from the parent metal vapor (e.g., titanium, hafnium, and/or zirconium) may be mixed with a solid oxidant powder which is different in composition from the solid oxidant-containing material substrate to permit the formation of a reaction product which is different than the reaction product which forms when the parent metal vapor contacts the substrate solid oxidant-containing material. This different reaction product could also serve as a filler material.

In a fourth preferred embodiment of the invention, each of the first and third embodiments discussed above can be expanded on by positioning a filler material on at least a portion of the surface of the solid oxidant-containing material. Accordingly, the filler material could be uniformly or non-homogeneously mixed with, for example, a powdered parent metal of substantially similar or substantially different composition than the vapor-phase parent metal. Moreover, the filler material could be mixed in a substantially uniform or non-homogeneous manner with a solid oxidant powder which is placed onto the surface of a solid oxidant-containing substrate material. Still further, a filler material may be mixed either substantially uniformly or non-homogeneously with the combination of a parent metal powder (having a substantially similar or substantially different composition than a parent metal vapor) and a solid oxidant.

In a fifth preferred embodiment of the invention, a solid oxidant-containing material is placed as a coating on a substrate material which normally would not react with a parent metal vapor so as to permit the formation of a reaction product coating having a composition different than the solid oxidant-containing material coating and the substrate material.

It should be understood that a large number of combinations of parent metal vapors, solid oxidant-containing materials, solid oxidant powders, parent metal powders, etc., are possible for utilization in accordance with the teachings of the present invention. Thus, while every potential combination of materials has not been expressly discussed above herein, such combinations should readily occur to those skilled in the art.

EXAMPLE 1

The following Example demonstrates a method for forming a ceramic composite coating on a graphite substrate by reacting a metal vapor with the graphite substrate at an elevated temperature.

FIG. 1 is a cross-sectional schematic of the lay-up used to form a ceramic composite coating on a graphite substrate coupon. Specifically, FIG. 1 is a cross-sectional schematic of a vapor deposition chamber 30 contained in a containment graphite boat 43. The vapor deposition chamber 30 was comprised of a lower chamber portion 31, three substrate supporting rods 35 attached to sidewalls of the lower chamber portion 31, four graphite metal source trays 34 and 33 within lower chamber portion 31, an upper chamber portion 32, a stack portion tube 36 containing a perforated plate 37 and attached to upper chamber portion 32, a closed end tube 41 covering the stack portion tube 36 and graphite felt getters 40 and 42 wrapped around stack portion tube 36 and vapor deposition chamber 30 respectively.

More specifically, the lower chamber portion 31 of the vapor deposition chamber 30 measured about 6.5 inches (165 mm) long, about 6.5 inches (165 mm) wide, about 4 inches (102 mm) high and had a wall thickness of about 0.25 inches (6.4 mm). The lower chamber portion 31 was machined from a piece of Grade ATJ graphite (Union Carbide Corporation, Carbon Products Division, Cleveland, Ohio). The three graphite support rods 35 with diameters of about 0.38 inch (9.6 mm) and made from Grade AGSX graphite (Union Carbide Corporation, Carbon Product Division, Cleveland, Ohio), were interference fit into holes in the sidewalls of the lower chamber portion 31. All of the support rods 35 were located about 2.0 inches (51 mm) from the bottom of the lower chamber portion 31. Additionally, each of the three support rods 35 were located about 1.0 inch (25 mm), about 1.75 inches (45 mm), and about 4.13 inches (105 mm), respectively, from one sidewall of the lower chamber portion 31 and extended from one sidewall to the opposite sidewall of the lower chamber portion 31. The support rods 35 formed a supporting means for holding the graphite substrate coupons during coating.

The upper chamber portion 32 of the vapor deposition chamber 30 measured about 6.5 inches (165 mm) long, about 6.5 inches (165 mm) wide, about 4 inches (102 mm) high, and had a wall thickness of about 0.25 inches (6.4 mm). The upper chamber portion 32 further included a hole 44 having a diameter of about 1.75 inches (44.5 mm). The hole 44 was substantially centrally located in a top portion of the upper chamber portion 32. The stack portion tube 36 measured about 5.5 inches (140 mm) long, had an outer diameter of about 2.25 inches (57 mm), and had a wall thickness of about 0.25 inches (6.4 mm). The stack portion tube 36 was also machined from Grade ATJ graphite. The open end of stack portion tube 36 was aligned with the hole 44 within the top of upper chamber portion 32 and glued to the upper chamber portion 32 with "RIGID-LOCK ®" graphite cement (Polycarbon Corporation, Valencia, Calif.). Additionally, about 10 sots 38 were cut in the closed end of stack portion tube 36. Each slot 38 measured about 0.04 inch (1 mm) wide and about 0.5 inch (13 mm) deep and provided a means for communicating between inner cavity of the vapor deposition camber 30 and the atmosphere external to vapor deposition chamber 30. The perforated plate 37 measured about 0.25 inch (6.4 mm) thick, had an outer diameter of about 1.75 inches (44.5 mm) and had three equally spaced holes for communicating with the atmosphere external to the vapor deposition chamber 30. Each hole 45 through perforated plate 37 had an about 0.4 inch (10 mm) diameter. The perforated plate 37 was secured with "RIGIDLOCK ®" graphite cement within stack portion tube 36 about 1.38 inches (35 mm) from the inner surface of upper chamber portion 32. The Grade GH graphite felt 40 (Fiber Materials, Inc. Biddeford, Me.) had a thickness of about 0.125 inch (3.2 mm) and was wrapped around the outer diameter and along the length of stack portion tube 36.

The closed end tube 41 measured about 4 inches (102 mm) long, had an outer diameter of about 3 inches (76 mm), and had a wall thickness of about 0.25 inch (6.4 mm). The closed end tube 41 was placed over stack portion tube 36 to secure graphite felt 40.

The graphite metal source trays were machined from Grade ATJ graphite. One graphite metal source tray 34 measured about 3.5 inches (89 mm) long, about 3.5 inches (89 mm) wide, about 1 inch (25 mm) high and had a wall thickness of about 0.25 inch (6.4 mm). The graphite metal source tray 34 was placed in one corner of lower chamber portion 31. The three additional graphite metal source trays 33 (only one shown in FIG. 1) measured about 2.5 inches (64 mm) long, 2.5 inches (64 mm) wide, 1 inch (25 mm) high and had a wall thickness of about 0.25 inch (6.4 mm). The three additional graphite metal source trays 33 were placed in the remaining space of the bottom of lower chamber portion 31. All the graphite metal source trays 34 and 33 were filled with titanium metal sponge material 46 to a depth ranging from about 0.25 inch (6.4 mm) to about 0.38 inch (9.7 mm) and therefore a total weight of about 100 grams.

The edges of a graphite substrate coupon of Grade AXZ-5Q graphite material (Poco Graphite, Inc., Decatur, Tex.), measuring about 1 inch (25 mm) long, about 1 inch (25 mm) wide and about 0.2 inch (5.1 mm) thick, were smoothed by sanding with 400 grit (average particle size of about 23 μm) silicon carbide paper. All the surfaces of the graphite substrate coupon were roughened by sanding with 1200 grit (average particle size of about 4 μm) silicon carbide paper. The sanded graphite substrate coupon 47 was then cleaned for about 15 minutes in an ultrasonically agitated bath of acetone and dried in an air oven set at about 120° C. for about 0.5 hour. After drying substantially completely, the graphite substrate coupon 47 was placed on support rods 35 within lower camber portion 31 and upper chamber portion 32 was placed in contact with lower chamber portion 31 to form the vapor deposition chamber 30. The Grade GH graphite felt 42 measured about 8 inches (203 μm) wide and had an about 0.125 inch (3.2 mm) thickness. The graphite felt 42 was wrapped around the outer perimeter of the vapor deposition chamber 30 twice. Graphite clamps 48 were used to secure the graphite felt 42 to the vapor deposition chamber 30, thus completing the formation of the setup. The setup was then placed into a larger containment graphite boat 43 to form a lay-up.

The lay-up and its contents were then placed into a vacuum furnace and the vacuum furnace door was closed. The vacuum furnace was then evacuated to about 0.2 millitorr. After about 50 minutes at about 0.2 millitorr, the vacuum furnace and its contents were heated to about 500° C. at about 250° C. per hour while maintaining a vacuum of less than about 60 millitorr. The vacuum furnace was then heated from about 500° C. to about 1000° C. at about 500° C. per hour while maintaining a vacuum of less than about 60 millitorr. At about 1000° C., the vacuum within the vacuum furnace was allowed to increase to between about 60 millitorr to about 250 millitorr and the vacuum furnace and its contents were heated from about 1000° C. to about 1900° C. at about 500° C. per hour. After about 2 hours at about 1900° C. with a vacuum ranging from about 60 millitorr to about 250 millitorr, the vacuum furnace and its contents were cooled at about 350° C. per hour to about room temperature while maintaining a vacuum ranging from about 60 millitorr to about 250 millitorr. At about room temperature, the vacuum pump was turned off, the vacuum furnace was allowed to come to atmospheric pressure and the lay-up and its contents were removed from the furnace.

Figure 2A:
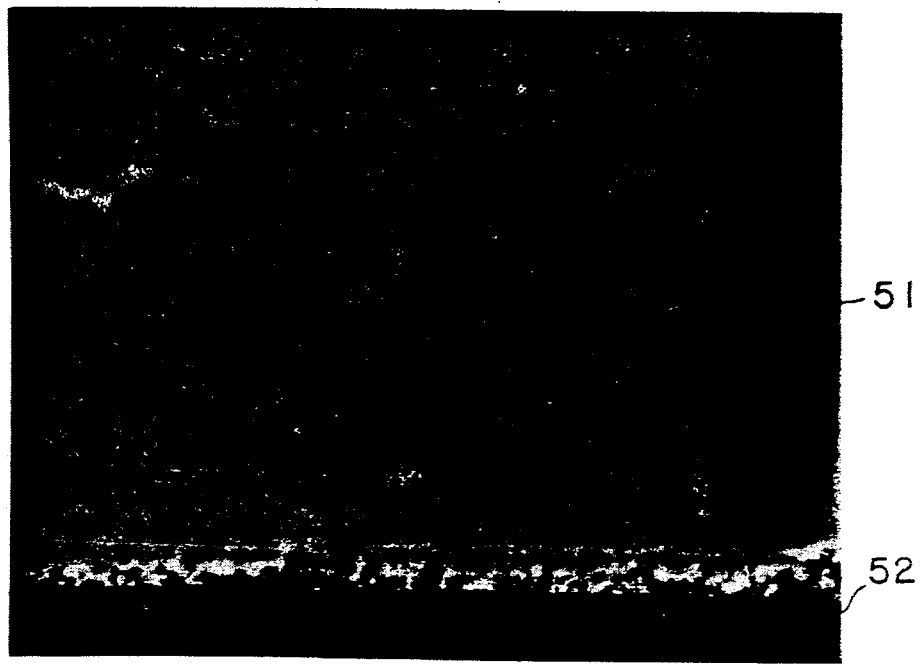
FIG. 2(a) is a photomicrograph taken at 400× of a sample made in accordance with Example 1.
Figure 2B:
FIG. 2(b) corresponds to a fractograph taken at 200× corresponding to fractured sample made in accordance with Example 1.

After the setup was disassembled, the graphite substrate coupon was removed from the lower chamber portion 31 of the vapor deposition chamber 30 and it was noted that a mirror like finish coated the surface of the graphite substrate coupon. Results of x-ray diffraction analysis of the ceramic composite coating indicated that constituents of the ceramic composite coating included, among other phases, TiC and C. The graphite substrate coupon was then cut, mounted and polished for metallographic examination as well as examination in an electron microscope. Specifically, FIG. 2a is a microstructure taken at about 400× of the ceramic composite coating 51 on the graphite substrate coupon 52 and FIG. 2b is a fractograph taken at about 200× in an electron microscope of the composite coating 51 on the graphite substrate coupon 52.

EXAMPLE 2

This Example further demonstrates a method for forming a ceramic composite coating on a graphite substrate by reacting a metal vapor with a graphite substrate at an elevated temperature.

Figure 3:
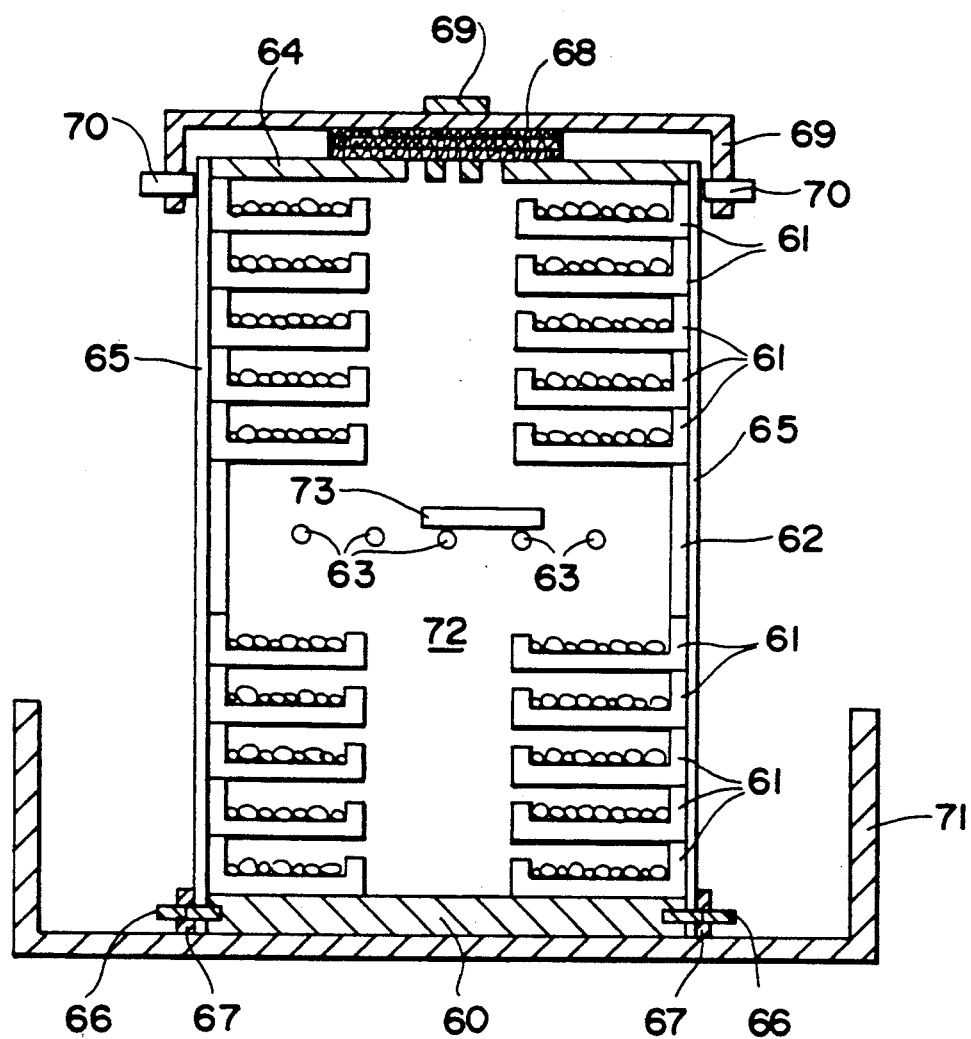
FIG. 3 comprises a schematic cross-sectional view of an assembly utilized to form a body in accordance with the present invention.

FIG. 3 is a cross-sectional schematic of the lay-up used to form a ceramic composite coating on a graphite substrate coupon. Specifically, FIG. 3 is a cross-sectional schematic of a vapor deposition chamber 72 in a containment graphite boat 71. The vapor deposition chamber 72 was comprised of a graphite plate 60, ten stackable source trays 61, a substrate support chamber portion 62, five substrate supporting rods 63 attached to side walls of stackable support chamber portion 62, a graphite lid 64 having holes therein, a graphite felt 68 substantially covering the holes in graphite lid 64, four stackable module alignment rods 65 attached to graphite plate 60 by threaded graphite rod 66 and fastened with nut 67, stackable module alignment clamps 69 engaging stackable module alignment rods 65 via set screw 70.

More specifically, graphite plate 60 was made from Grade ATJ graphite (Union Carbide Corporation, Carbon Products Division, Cleveland, Ohio). Additionally, graphite plate 60 measured about 6.5 inches (165 mm) long, 6.5 inches (165 mm) wide, and 0.5 inches (13 mm) high. The mid points of the face of graphite plate 60 that measured about 6.5 inches (165 mm) long and about 0.5 inches (13 mm) high were drilled and tapped to accept threaded graphite rod 66.

Stackable metal source trays 61 measured about 6.5 inches (165 mm) long, about 6.5 inches (165 mm) wide, 0.75 inches (19 mm) high and had a wall thickness of about 0.25 inches (6.4 mm). A hole substantially in the center of the 6.5 inch (165 mm) long and 6.5 inch (165 mm) wide portion of stackable metal source tray 61 measured about 2 inches (51 mm) long and about 2 inches (51 mm) wide. Along the perimeter the 2 inches (51 mm) long and 2 inches (51 mm) wide hole was fastened with "RIGIDLOCK®" graphite cement (Polycarbon Corporation, Valencia, Calif.), a 2.5 inches (64 mm) long, 2.5 inches (64 mm) wide, 0.25 inch (6.4 mm) high and 0.25 inch (6.4 mm) thick graphite rectangular frame in order to complete the formation of the stackable metal source trays 61.

Stackable substrate support chamber portion 62 measured about 6.5 inches (165 mm) long, 6.5 inches (165 mm) wide, 2.0 inches (51 mm) high, and had a wall thickness of about 0.25 inches (6.4 mm). Five substrate support rods 63, each having a diameter of about 0.38 inches (9.6 mm) and measuring about 6.5 inches (165 mm) long, were interference fit into the side walls of substrate support chamber portion 62. All of the support rods 63 were located about 1.0 inches (25 mm) from the bottom of the substrate support chamber portion 62. Additionally, each of the five support rods 63 were located about 1 inch (25 mm), about 2 inches (51 mm), about 3 inches (76 mm), about 4 inches (102 mm), and about 5 inches (127 mm), respectively from one side wall from the substrate support chamber portion 62 and extended from one side wall to the opposite side wall of the substrate support chamber portion 62. The support rods 63 formed a supporting means for holding the graphite substrate coupons during coating.

The graphite lid 64 measured about 6.5 inches (165 mm) long, about 6.5 inches (165 mm) wide, and about 0.25 inch (6.4 mm) thick. About 5 holes were substantially centrally located in graphite lid 64 and provided a means for communicating with the atmosphere external to vapor deposition chamber 72. Each hole measured about 0.25 inches in diameter.

Vapor deposition chamber 72 was assembled by first placing graphite plate 60 on a leveled table top. A designated number of stackable metal source trays 61 were then filled with about 250 grams of zirconium sponge material (Western Zirconium, Ogden, Utah) having a diameter ranging from about 0.033 inch (0.84 mm) to about 0.25 inch (6.4 mm). The zirconium sponge material was evenly distributed within each stackable metal source tray. Five stackable source trays 61 were placed one on the other, on the graphite plate 60 and substantially were aligned. A substrate support chamber portion 62 was then placed onto and aligned with the five stackable metal source trays 61. A graphite substrate coupon 73 was placed within the substrate support chamber portion 62 on substrate support rods 63. The five additional stackable metal source trays 61, each having about 250 grams of a zirconium sponge material therein, were stacked above the substrate support chamber portion 62. The graphite lid 64 was then placed on top of the upper most stackable metal source tray 61. Four stackable module alignment bars 65, measuring about 10.25 inches (260 mm) long, 2.0 inches (51 mm) wide, and about 0.38 inch (9.6 mm) thick and having a hole at one end for receiving threaded graphite rod 66 were placed over and secured to threaded graphite rod 66 to substantially align a ten stackable metal source tray 61 and the substrate support chamber portion 62 and the graphite lid 64. At least three layers of Grade GH graphite felt 68 (Fiber Materials, Inc., Biddeford, Mass.) measuring about 0.125 inches (3.2 mm) thick were placed over the holes in graphite lid 64. A first module alignment clamp 69 measuring about 8 inches (203 mm) long, 1 inch (25 mm) wide and about 0.25 inch (6.4 mm) thick with extending end portions measuring about 1 inch (25 mm) long, 1 inch wide (25 mm) and about 0.5 inch (1.3 mm) thick, was placed in contact with graphite felt 68 such that extending end portion containing set screw 70 aligned with stackable module alignment bar 65. Set screw 70 in module alignment clamp 69 was then adjusted to secure stackable module alignment bar 65 against graphite lid 64, stackable metal source trays 61 and substrate support chamber portions 62. A second module alignment clamp 69 was placed in contact with and perpendicular to the first module alignment clamp 69 and the sets screws 70 were tighten to a second set of stackable module alignment bars 65 aligning graphite lid 64, substrate support chamber 62, and stackable metal source trays 61 and completing the formation of the set-up. The set-up comprising the vapor deposition chamber 72 was then placed into a containment graphite boat 71 to form a lay-up.

The lay-up and its contents were placed in a vacuum furnace and the vacuum furnace door was closed. The vacuum furnace was evacuated in about 15 minutes and then filled with argon. After the vacuum furnace was substantially completely filled with argon, the vacuum furnace was evacuated to about 0.12 millitorr. The vacuum furnace and its contents were then heated to about 1000° C. at about 350° C. per hour while maintaining a vacuum of less than about 60 millitorr. The furnace was then heated from about 1000° C. to about 2000° C. at about 350° C. per hour while maintaining a vacuum between about 60 millitorr and about 250 millitorr. After about 5 hours at about 2000° C. with a vacuum ranging from about 60 millitorr to about 250 millitorr. The vacuum furnace and its contents were cooled at about 350° C. per hour to about room temperature. At about room temperature, the vacuum pump was turned off, the vacuum furnace was allowed to come to atmospheric pressure, and the lay-up and its contents were removed from the vacuum furnace.

After the setup was disassembled, the graphite substrate coupon was removed from within the substrate support chamber portion 62 of the vapor deposition chamber 72 and it was noted that a metallic like finish coated the graphite substrate coupon. The graphite substrate coupon was cut, mounted and polished for metallographic examination. Specifically, the examination of the ceramic composite coating using optical microscopy revealed that a ceramic composite coating thickness of about 73 μm had been formed on the graphite substrate coupon. Analysis of the ceramic composite coating by x-ray diffraction indicated that constituents of the ceramic composite coating included, among other phase, ZrC and C.

EXAMPLE 3

The following Example demonstrates a method for forming a ceramic matrix composite coating on a graphite substrate by applying to the surface of a graphite substrate a mixture comprising a parent metal powder and a boron carbide powder and heating the powder covered graphite substrate in the presence of a metal vapor to permit the reaction between the parent metal powder, the boron carbide, the metal vapor and/or the graphite substrate.

The method of Example 1 was substantially repeated except that a smaller vapor deposition chamber and zirconium sponge material (Western Zirconium, Ogden, Utah) having a diameter ranging from about 0.033 inch (0.84 mm) to about 0.25 inch (6.4 mm) were used. Specifically, the outer dimensions of the smaller vapor deposition chamber measured about 3.5 inches (89 mm) long, 3.5 inches (89 mm) wide and about 7 inches (178 mm) high and the stack portion measured about 3.25 inches (83 mm) long, had an about 1.25 inches (32 mm) diameter and had a wall thickness of about 0.25 inch (6.4 mm). Only one graphite metal source tray measuring about 2.5 inches (64 mm) long, 2.5 inches (64 mm) wide, 1 inch (25 mm) high and having a wall thickness of about 0.25 inch (6.4 mm), was placed in the bottom of the lower chamber portion of the smaller vapor deposition chamber.

Additionally, one face of the graphite substrate coupon was coated with the slurry mixture described in Example 1, comprised of −325 mesh zirconium powder and "TETRABOR ®" 1000 grit (average particle diameter 5 μm) boron carbide (ESK Engineered Ceramics, New Canaan, Conn.) such that when the slurry mixture dried, a powder coating thickness of about 254 μm and weighing about 0.38 grams formed on the graphite substrate coupon. As in Example 1, the setup was placed into a larger containment graphite boat to form the lay-up.

The lay-up and its contents were placed into a vacuum furnace and the furnace door was closed. The vacuum furnace was evacuated in about 15 minutes and then filled with argon. After the vacuum furnace was substantially completely filled with argon, the vacuum furnace was evacuated to about 0.12 millitorr. The vacuum furnace and its contents were then heated to about 1000° C. at about 350° C. per hour while maintaining a vacuum of less than about 60 millitorr. The vacuum furnace was then heated from about 1000° C. to about 2000° C. at about 350° C. per hour while maintaining a vacuum ranging from about 60 millitorr to about 250 millitorr. After about 5 hours at about 2000° C. with a vacuum ranging from about 60 millitorr to about 250 millitorr, the vacuum furnace and its contents were cooled at about 350° C. per hour to about room temperature. At about room temperature, the vacuum pump was turned off, the vacuum furnace was allowed to come to about atmospheric pressure, and the lay-up and its contents were removed from the vacuum furnace.

Figure 4A:
FIG. 4(a) is a photomicrograph taken at 100× of a body made in accordance with Example 3.
Figure 4B:
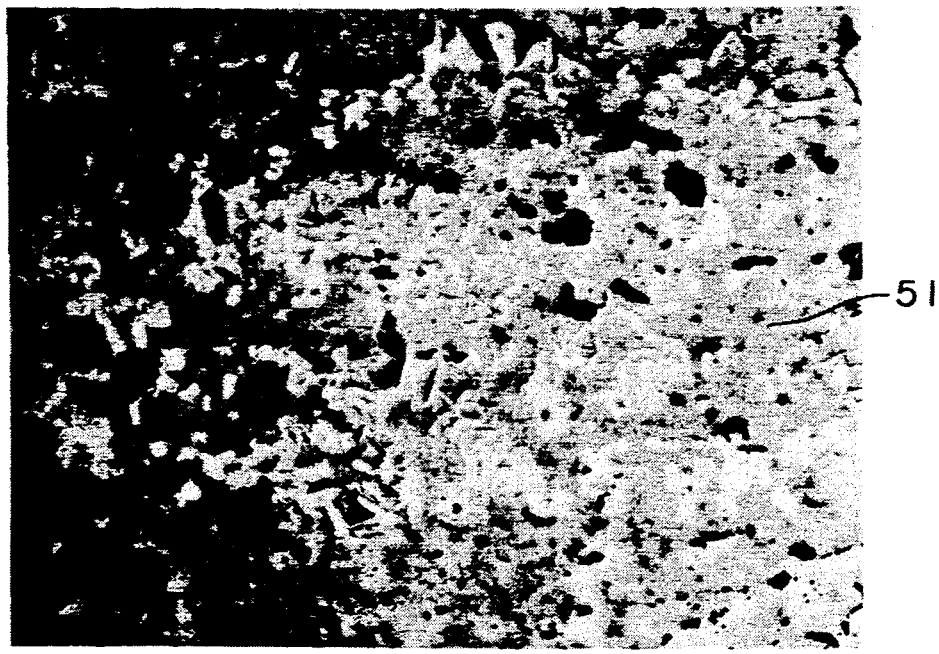
FIG. 4(b) is a photomicrograph taken at 400× of a sample made in accordance with Example 3.

After the setup was disassembled, the graphite substrate coupon was removed from the lower chamber portion of the smaller vapor deposition chamber and it was noted that a metallic like finished coated the surface of the graphite substrate. The graphite substrate was then cut, mounted and polished for metallographic examination. Specifically, FIG. 4a is a microstructure taken at about 100× of the ceramic composite coating 51 on the graphite substrate 52. FIG. 4b is a microstructure taken at about 400× of the ceramic composite coating illustrating the platlet morphology of the ceramic composite coating 51.

EXAMPLE 4

The following Example demonstrates a method for forming a ceramic composite coating on a graphite substrate by applying to the surface of the graphite substrate a mixture comprising a boron powder and heating the powder covered graphite substrate in the presence of a metal vapor to permit the reaction between the boron powder, the metal vapor and/or the graphite substrate.

The method of Example 1 was substantially repeated except for the methods of preparing and coating the surface of the graphite substrate coupon. Specifically, the surface of the graphite substrate coupon was abraded with 1200 grit (average particle size of about 4 μm) silicon carbide paper to smooth all the surfaces. The sanded graphite substrate coupon was then cleaned for about 15 minutes in an ultrasonically agitated bath of acetone and dried in a forced air oven set at about 120° C. for about 0.5 hours. After drying substantially completely, the graphite substrate coupon was coated with a solution comprised of by weight about 10 percent "GAF ®" PVP K-15 polyvinyl pyrrolidone (GAF Chemical Corporation, Wayne, N.J.) and ethanol. After allowing the coating on the surface of the graphite substrate coupon to air dry for about 15 minutes, the graphite substrate coupon was placed in a forced air oven set at about 120° C. After about 0.5 hour at about 120° C., the graphite substrate coupon was removed from the forced air oven and cooled to about room temperature. At about room temperature, the graphite substrate coupon was again coated with a solution comprised of by weight of about 75 to about 85 percent "ELMER'S ®" professional carpenter's wood glue and the balance deionized water. The graphite substrate coupon was then swabbed with an additional amount of deionized water. While the wood glue, deionized water solution was still wet, −325 mesh (particle diameter less than about 45 μm) boron powder (Consolidated Astronautics, Inc. Saddle Brook, N.J.) was hand sifted onto one surface of the graphite substrate coupon. Excess boron powder, that had not adhered to the surface of the graphite substrate coupon, was brushed off with a camel's hair brush. The powder coated graphite substrate coupon was then placed in a forced air oven set at about 45° C. After about 0.5 hour at about 45° C., the powder coated graphite substrate coupon was moved to a second forced air oven set at about 120° C. After about 0.5 hour at about 120° C. in the second forced air oven, the powder coated graphite substrate coupon was removed and allowed to cool to about room temperature. Once at about room temperature, the powder coated graphite substrate coupon was placed onto the substrate support rods 35 (refer to FIG. 1) within the lower chamber portion 31 of the vapor deposition chamber 30 and the upper chamber portion 32 was placed over the lower chamber portion.

Additional exceptions of this Example relative to Example 1 were that the titanium sponge material (Oregon Metallurgical Corporation, Albany, Oreg.) weighing about 400 grams, was not placed into a graphite metal source trays but directly into the bottom of the lower chamber portion 31 of the vapor deposition chamber 30 and the stack portion 36 of the vapor deposition chamber was not covered with closed end crucible 41. The vapor deposition chamber 30 was placed into a containment graphite boat 43 to complete the formation of the lay-up.

The lay-up and its contents were placed into a vacuum furnace and the vacuum furnace door was closed. The vacuum furnace was then evacuated. After about 0.5 hour under a vacuum of less than about 60 millitorr, the vacuum furnace was heated to about 500° C. at about 250° C. per hour and then from about 500° C. to about 1000° C. at about 500° C. while maintaining a vacuum less than 60 millitorr. At about a 1000° C., the vacuum was allowed to increase to between about 60 millitorr and about 250 millitorr and the vacuum furnace was heated to about 1900° C. at about 500° C. per hour. After about 2.5 hours at about 1900° C., while maintaining a vacuum between about 60 millitorr and about 250 millitorr, the vacuum furnace and its contents were cooled to about room temperature at about 350° C. per hour. At about room temperature, the vacuum pump was turned off, the vacuum furnace was allowed to come to about atmospheric pressure, and the lay-up and its contents were removed from the vacuum furnace.

Figure 5:
FIG. 5 is a photomicrograph taken at 400× made in accordance with Example 4.

After the lay-up was disassembled, the graphite substrate coupon was removed from within the lower chamber portion of the vapor deposition chamber and it was noted that a metallic appearing finish coated the graphite substrate coupon. The graphite substrate coupon was then cut, mounted and polished for metallographic examination. Specifically, the examination of the ceramic coating by optical microscopy revealed that a coating thickness of about 200 μm had been formed. Results of x-ray diffraction analysis indicated that ceramic composite coating comprised among other phases, $TiB_2$ and $TiC$. Specifically, FIG. 5 is a microstructure taken at about 400× of the ceramic composite coating 51 on the graphite substrate coupon 52.

EXAMPLE 5

The following Example demonstrates a method for forming a ceramic composite coating on a graphite substrate by applying to the surface of a graphite substrate a boron carbide powder and heating the powder covered substrate in the presence of a metal vapor to permit the reaction between the boron carbide power, the metal vapor and/or the graphite substrate.

The method of Example 1 was substantially repeated except for the methods of preparing and coating the surface of the graphite substrate coupon. Specifically, a solution comprised by weight of about 6 percent "ELVACITE ®" 2045 acrylic resin (E. I. du Pont de Nemours and Company, Inc., Wilmington, Del.), 0.06 percent n-butyl phthalate (Fisher Scientific Company, Pittsburgh, Pa.), about 42.28 percent isopropyl alcohol, and about 51.66 percent ethylene glycol monobutyl ether (Textile Chemical Company, Reading, Pa.), was combined in a plastic jar and placed on a shaker to effect mixing. After about 0.5 hour on a shaker, the plastic jar was removed to a slow roll jar mill. After about 1 hour on the slow roll jar mill, an amount of "TETRABOR ®" 1000 grit (average particle diameter 5 μm) boron carbide powder (ESK Engineered Ceramics, New Canaan, Conn.) was added to the solution to make a slurry mixture comprising by weight about 50% boron carbide and about 50% solution. The plastic jar was replaced to the slow roll jar mill to suspend the boron carbide in the solution and thereby form a slurry mixture. After at least about an 0.5 hour on the slow roll jar mill, a slurry mixture was formed and applied to the surface of the graphite substrate coupon that had been prepared as described in Example 4. After the slurry mixture on the graphite substrate coupon had substantially dried, the powder covered graphite substrate coupon was placed into the graphite support rods in the lower portion of the vapor deposition chamber. The vapor deposition chamber was then placed into a containment graphite boat to complete the formation of the lay-up.

The lay-up and its contents were placed in a vacuum furnace and the vacuum furnace door was closed. The vacuum furnace was evacuated to about 0.12 millitorr. After about 25 minutes at about 0.12 millitorr, the vacuum furnace and its contents were heated from about room temperature to about 500° C. at about 250° C. per hour and then from about 500° C. to about 1000° C. at about 500° C. per hour while maintaining a vacuum less than about 60 millitorr. The vacuum furnace was then heated from about 1000° C. to about 1900° C. at about 500° C. per hour while maintaining a vacuum between about 60 millitorr and about 250 millitorr. After about 2 hours at about 1900° C. with a vacuum ranging between about 60 millitorr and about 250 millitorr, the vacuum furnace and its contents were cooled at about 350° C. per hour to about room temperature. At about room temperature, the vacuum pump was turned off and the vacuum furnace pressure was allowed to come to about atmospheric pressure. At about room temperature and the lay-up and its contents were removed from the vacuum furnace. The setup was disassembled and the graphite substrate coupon was removed from within the lower chamber portion of the vapor deposition chamber. It was noted that a metallic appearing finish coated the surface of the graphite substrate coupon. Results of x-ray diffraction analysis indicated that the ceramic composite coating comprised, among other phases, TiC, TiB, and $B_4C$.

EXAMPLE 6

The following Example demonstrates a method for forming ceramic composite coating on a graphite substrate by applying to the surface of a graphite substrate an additional powder and heating the powder covered graphite substrate in the presence of a metal vapor to permit the incorporation of the additive powder in a ceramic composite coating formed by the reaction between the metal vapor and the graphite substrate. Table I contains a summary for Sample A through Sample O of the additive powder size and composition, the thickness of the additive powder coating, the processing temperature to effect the formation of the ceramic composite coating, the processing time to effect to the formation of the ceramic composite coating and the thickness of the ceramic composite coating on a graphite substrate.

Specifically, the composition of the additive powders placed onto graphite substrate coupons included: −325 mesh (particle diameter less than about 45 μm) titanium carbide (Atlantic Equipment Engineers, Bergenfield, N.J.), 1–5 μm particle diameter titanium diboride (Atlantic Equipment Engineers, Bergenfield, N.J.); 14.4 μm average particle diameter silicon tetraboride (Atlantic Equipment Engineers, Bergenfield, N.J.); −325 mesh (particle diameter less than about 45 μm) silicon hexaboride (Consolidated Astronautics, Inc., Saddle Brook, N.J.), 12.6 μm average particle diameter hafnium diboride (Var Lac Oid Chemical Co., Inc., Bergenfield, N.J.), −325 mesh (particle diameter less than about 45 μm) tungsten monoboride (Cerac, Inc., Milwaukee, Wis.), −325 mesh (particle diameter less than about 45 μm) ditungsten pentaboride (Cerac, Inc., Milwaukee, Wis.), −325 mesh (particle diameter less than about 45 μm) tantalum diboride (Atlantic Equipment Engineers, Bergenfield, N.J.), 1–5 μm particle diameter titanium nitride (Atlantic Equipment Engineers, Bergenfield, N.J.), 1–5 μm particle diameter zirconium nitride (Atlantic Equipment Engineers, Bergenfield, N.J.), −325 mesh (particle diameter less than about 45 μm) pentatitanium trisilicide (Atlantic Equipment Engineers, Bergenfield, N.J.), 1–5 μm mesh particle diameter titanium disilicide (Atlantic Equipment Engineers, Bergenfield, N.J.), 1–5 μm molybdenum disilicide (Atlantic Equipment Engineers, Bergenfield, N.J.), −100 mesh (particle diameter less than about 150 μm) molybdenum (Consolidated Astronautics Co., Inc., Saddle Brook, N.J.) and −325 mesh (particle diameter less than about 45 μm) rhenium (Rembar Co., Dobbs, N.Y.). The method of Example 1 was substantially repeated to prepare the graphite substrate coupon for coating and the method of Example 5 was substantially repeated for Sample A through Sample O in order to slurry coat and effect the formation of the ceramic composite coating on the graphite substrate coupons.

Figure 6A:
FIGS. 6(a), 6(b), 6(c), 6(d), 6(e), 6(f), 6(g), 6(h), 6(i), 6(j), 6(k), 6(l), 6(m), 6(n), 6(o), 6(p), 6(q), 6(r), 6(s), 6(t), 6(u) and 6(v) are photomicrographs and fractographs taken at various magnifications (identified in specification) corresponding to samples made in accordance with Example 6.

As was done in Example 5, the ceramic composite coated graphite substrate coupons were cut, mounted and polished for metallographic examination and fracture surfaces of the ceramic composite coating on the graphite substrate coupon were examined using an electron microscope. Additionally, analysis of the ceramic composite coating by x-ray diffraction was performed. Specifically, FIG. 6a is a fractograph taken at about 500× the ceramic composite coating 51 on the graphite substrate coupon 52 corresponding to Sample A. Results of x-ray diffraction analysis indicated that the constituents of the ceramic composite coating on Sample A included, among other phases, titanium carbide.

Figure 6B:
Figure 6C:
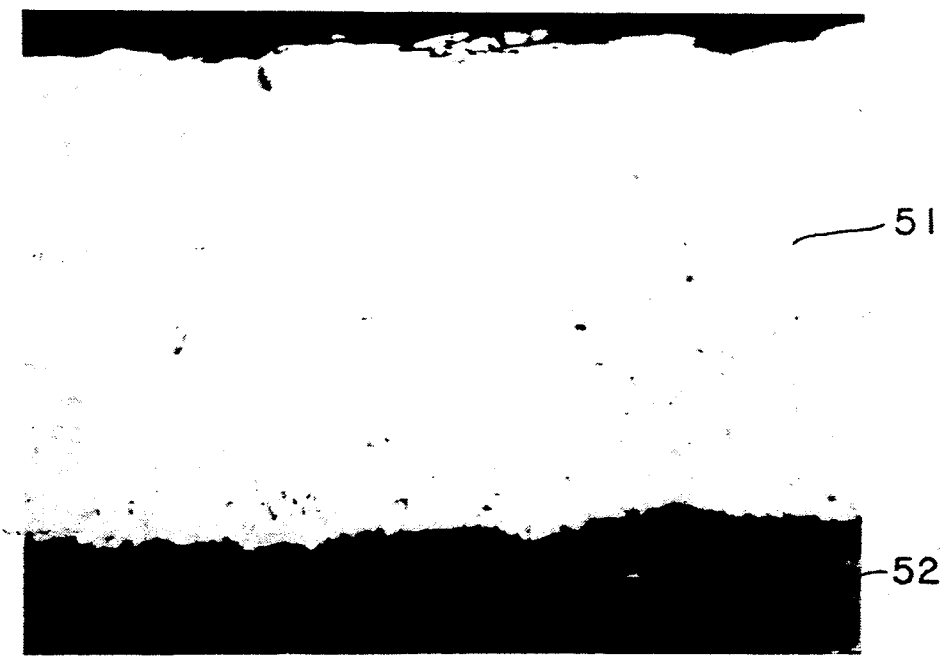

FIG. 6b is a fractograph taken at about 200× of the ceramic composite coating 51 on the graphite substrate coupon 52 and FIG. 6c is a microstructure taken at about 400× of the ceramic composite coating 51 on the graphite substrate 52 corresponding to Sample B.

Figure 6D:
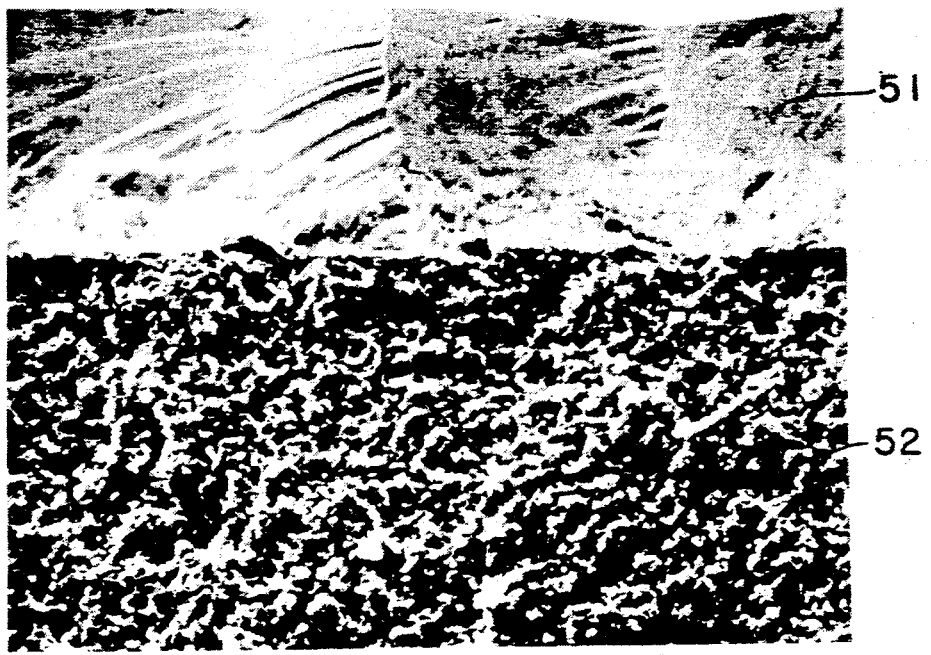
Figure 6E:
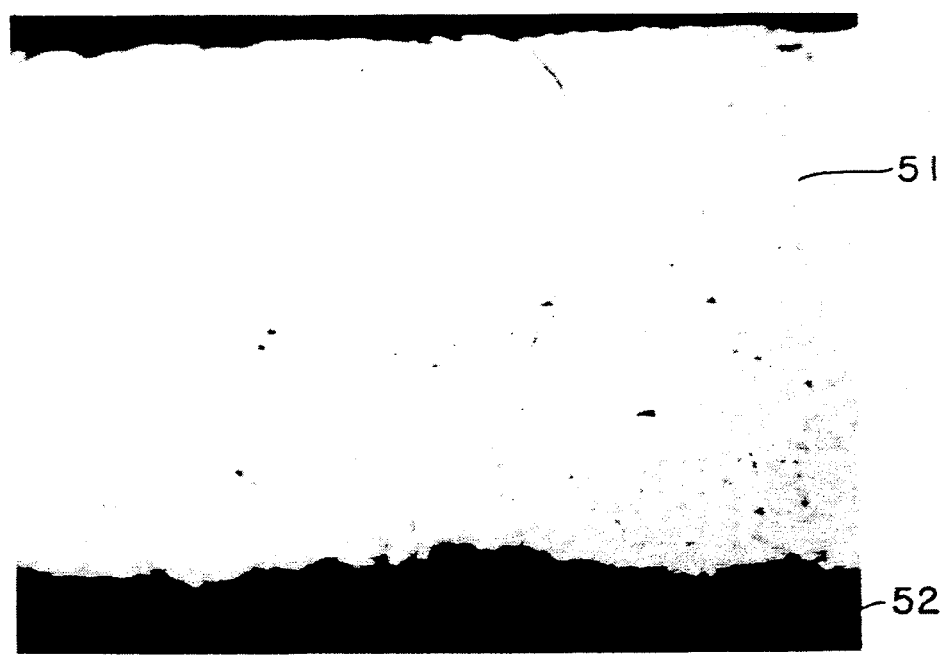

FIG. 6d is a fractograph taken at about 200× of the ceramic composite coating 51 on the graphite substrate coupon 52 and FIG. 6e is a photomicrograph of the microstructure taken at about 400× of the ceramic composite coating 51 on the ceramic substrate coupon 52 and corresponding to Sample C. Results of x-ray diffraction analysis indicated that the constituents of the ceramic composite coating on Sample C included among other phases TiC, $SiB_4$ and C.

Figure 6F:
Figure 6G:
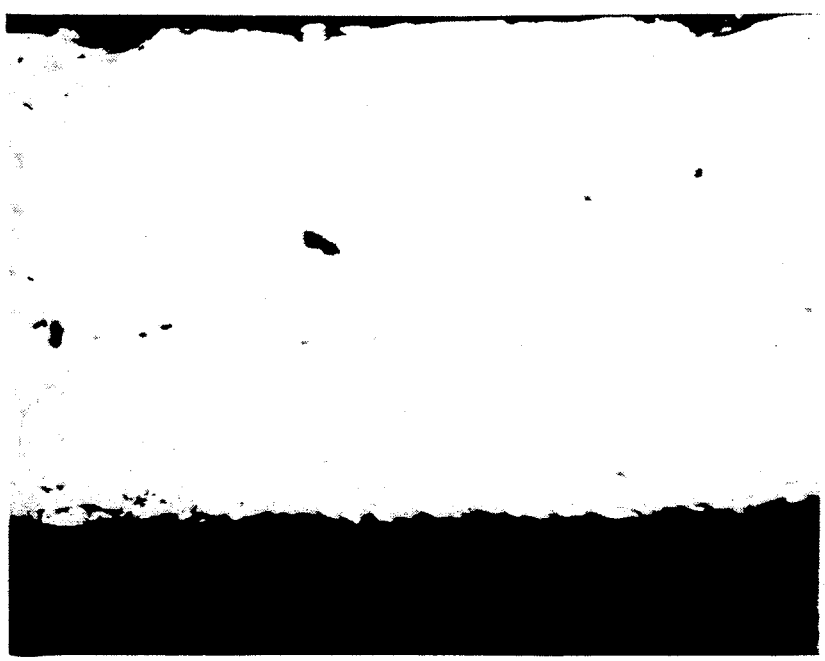

FIG. 6f is a fractograph taken at about 500× of the ceramic composite coating 51 on the graphite substrate coupon 52 and FIG. 6g is a photomicrograph of the microstructure taken at about 400× of the ceramic composite coating 51 on the graphite substrate 52 corresponding to Sample D. Results of x-ray diffraction analysis indicated that the constituents of the ceramic composite coating on Sample D included, among other phases, TiC, $TiB_2$ and C.

Figure 6H:
Figure 6I:
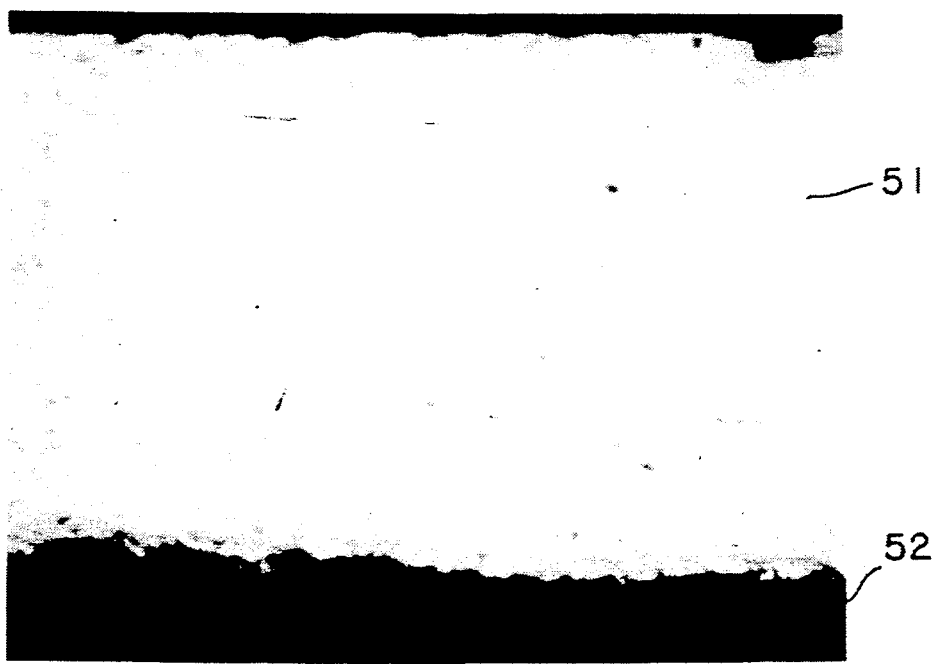

FIG. 6h is a fractograph taken at about 200× of the ceramic composite coating 51 on the graphite substrate 52 and FIG. 6i is a photomicrograph of the microstructure taken at about 400× of the ceramic composite coating 51 on the graphite substrate 52 and corresponding to Sample E. Results of x-ray diffraction analysis indicated that the constituents of the ceramic composite coating on Sample E included, among other phases, TiC, C, and $HfB_2$.

Figure 6K:
Figure 6J:
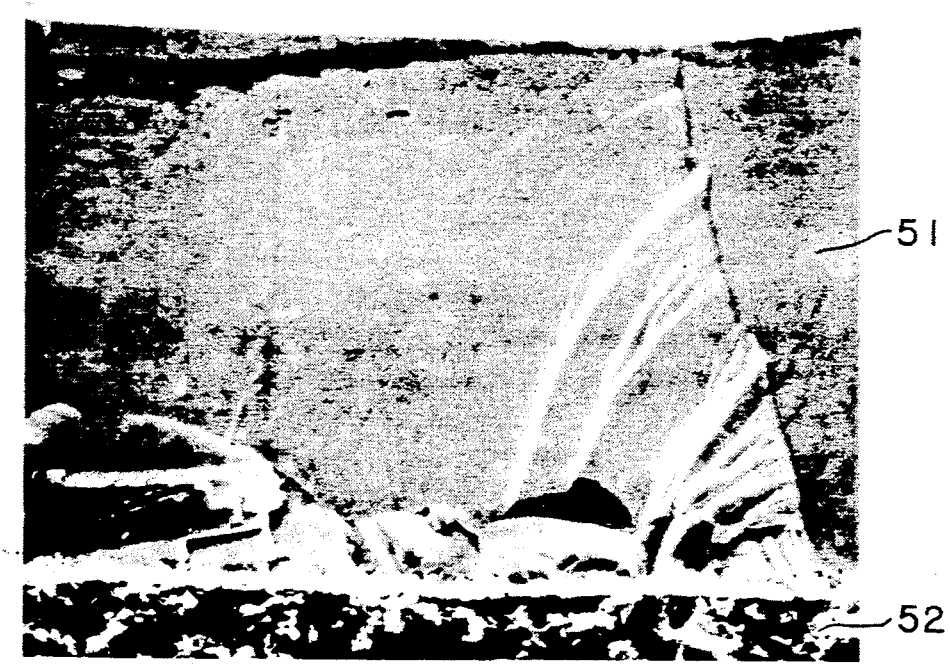

FIG. 6j is a fractograph taken at about 500× of the ceramic composite coating 51 on the graphite substrate coupon 52 and FIG. 6k is a photomicrograph of the microstructure taken at about 400× of the ceramic composite coating 51 on the graphite substrate coupon corresponding to Sample F. Results of x-ray diffraction analysis indicated that the constituents of the ceramic composite coating on Sample F included, among other phases, titanium carbide and carbon.

Figure 6L:
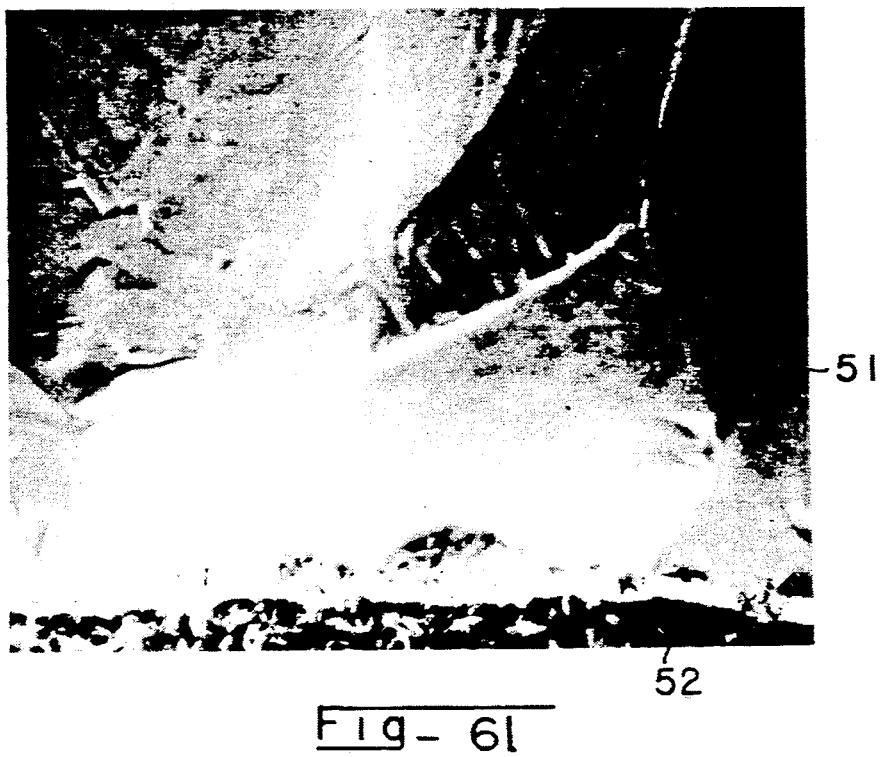
Figure 6M:

FIG. 6l is a fractograph taken at about 500× of the ceramic composite coating 51 on the graphite substrate coupon 52 and FIG. 6m is a photomicrograph of the microstructure taken at about 400× of the ceramic composite coating 51 on the graphite substrate coupon 52 corresponding to Sample G. Results of x-ray diffraction analysis indicated that the constituents of the ceramic composite coating on Sample G included, among other phases, TiB$_2$ and C.

Figure 6O:
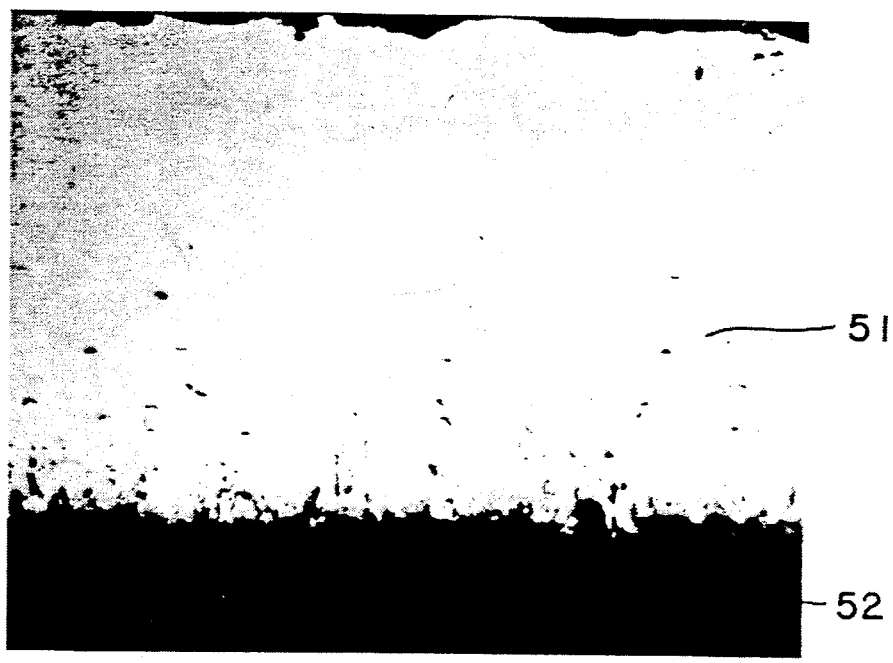
Figure 6N:
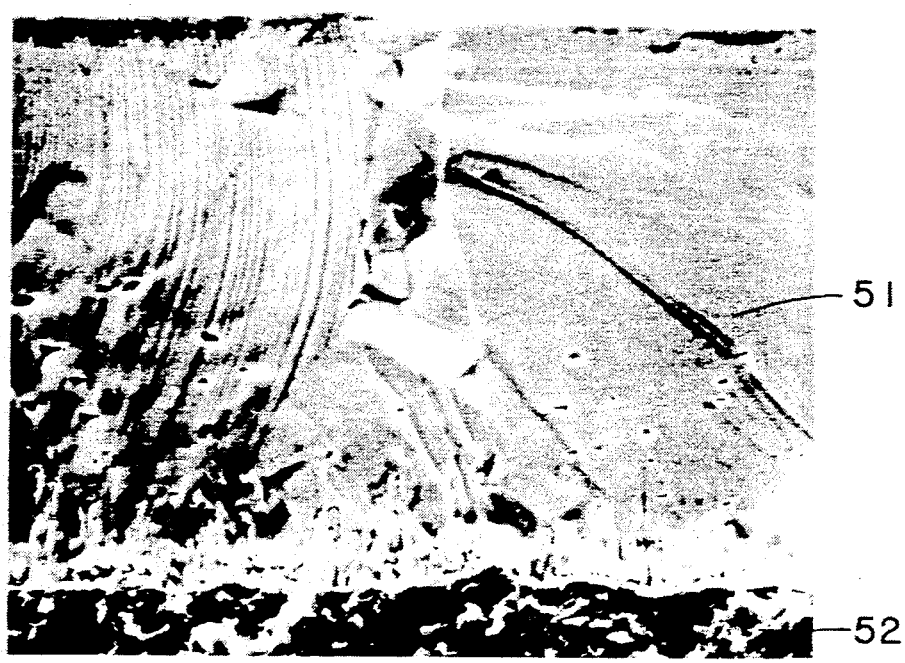

FIG. 6n is a fractograph taken at about 500× of the ceramic composite coating 51 on the graphite substrate 52 and FIG. 6o is a photomicrograph of the microstructure taken at about 400× of the ceramic composite coating 51 on the graphite substrate coupon 52 corresponding to Sample H.

Figure 6P:

FIG. 6p is a fractograph taken at about 200× of the ceramic composite coating 51 on the graphite substrate coupon 52 corresponding to Sample I. Results of x-ray diffraction analysis indicated that the constituents of the ceramic composite coating on Sample I include, among other phases, TiC.

Figure 6Q:
Figure 6R:
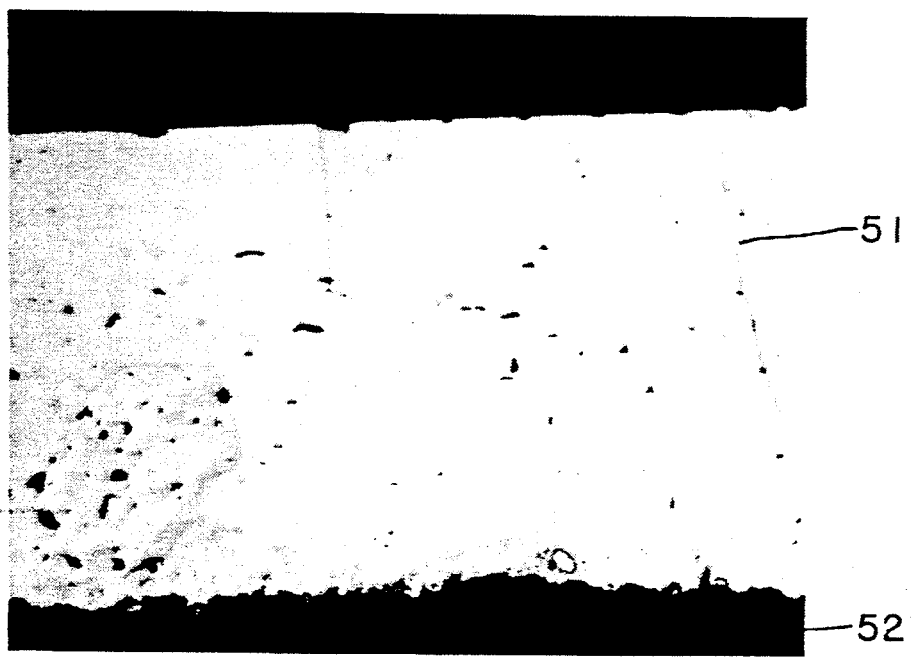

FIG. 6q is a fractograph taken at about 500× of the ceramic composite coating 51 on the graphite substrate 52 and FIG. 6r is a photomicrograph of the microstructure taken at about 400× of the ceramic composite coating 51 on the graphite substrate coupon 52 corresponding to Sample J. Results of x-ray diffraction analysis indicated that the constituents of the ceramic composite coating on Sample J included, among other phases, TiC and C.

Figure 6S:

FIG. 6s is a fractograph taken at about 200× of the ceramic composite coating 51 on the graphite substrate coupon 52 corresponding to Sample K. Results of x-ray diffraction analysis indicated that the constituents of the ceramic composite coating on Sample K included, among other phases, TiC, Ti$_5$Si$_3$.

Figure 6T:
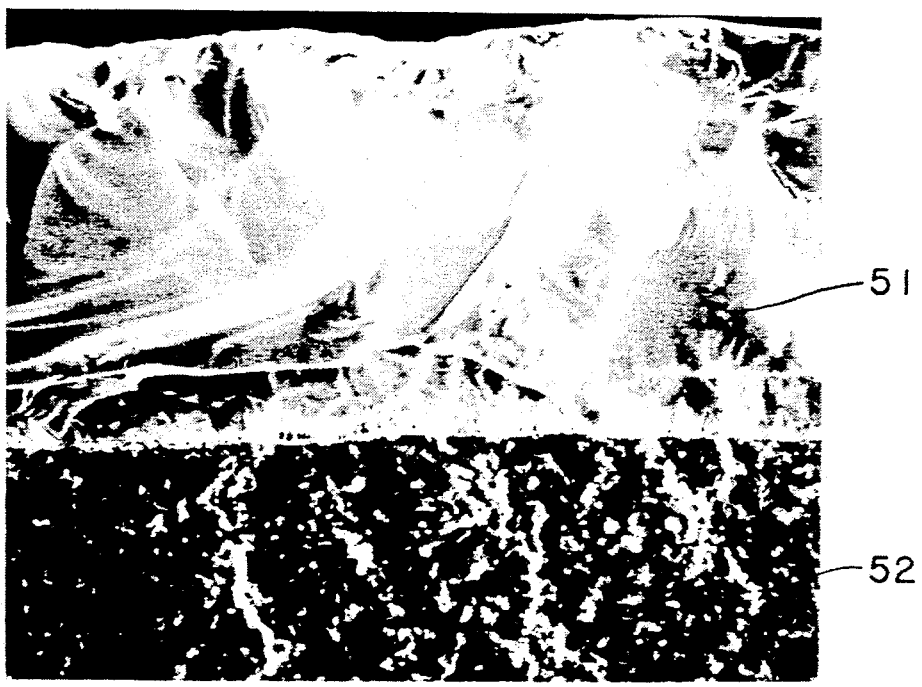

FIG. 6t is a fractograph taken at about 200× of the ceramic composite coating 51 on the graphite substrate coupon 52 and corresponding to Sample M. Results of x-ray diffraction analysis indicated that the constituents of the ceramic composite coating on Sample M included, among other phases, TiC.

Figure 6V:
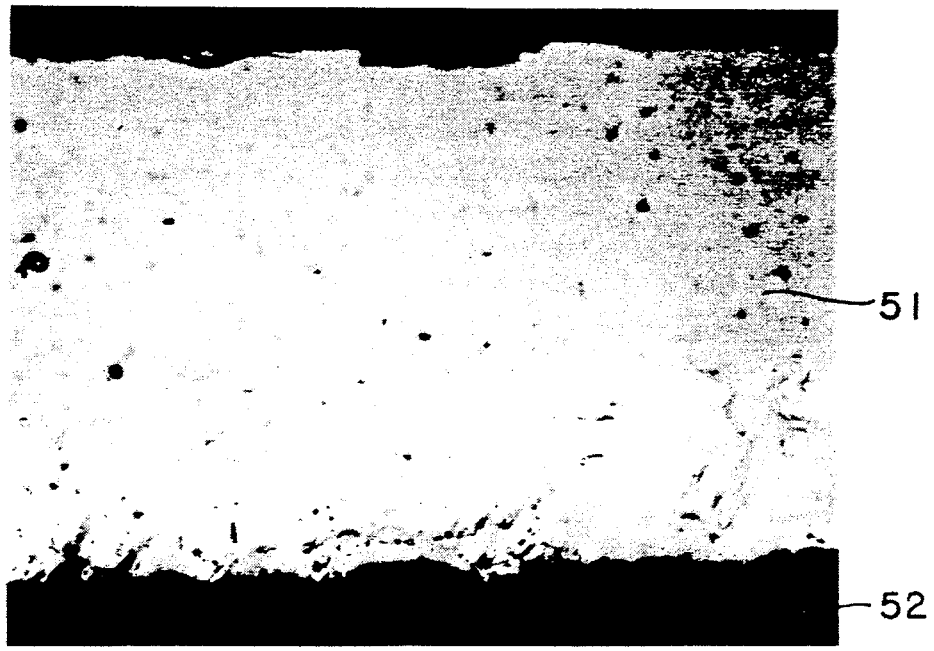
Figure 6U:

FIG. 6u is a fractograph taken at about 500× of the ceramic composite coating 51 on the graphite substrate coupon 52 and FIG. 6v is a photomicrograph of the microstructure taken at about 400× of the ceramic composite coating 51 on the graphite substrate coupon 52 corresponding to Sample O. Results of x-ray diffraction analysis indicated that the constituent of the ceramic composite coating on Sample O included, among other phases, TiC.

TABLE I

| Sample | Parent Metal Vapor | Additive Powder Size & Composition | Thickness of Powder Coating | Processing Temperature | Processing Time at Processing Temperature | Ceramic Composite Coating Thickness |
| --- | --- | --- | --- | --- | --- | --- |
| A | Ti | −325 mesh TiC | 178 μm | 1900° C. | 2 hours | 150 μm |
| B | Ti | 1-5 μm TiB$_2$ | 51 μm | 1900° C. | 2 hours | 148 μm |
| C | Ti | 14.4 μm* SiB$_4$ | 89 μm | 1900° C. | 2 hours | 155 μm |
| D | Ti | −325 mesh SiB$_6$ | 64 μm | 1900° C. | 2 hours | 140 μm |
| E | Ti | 12.6 μm* HfB$_2$ | 102 μm | 1900° C. | 2 hours | 157 μm |
| F | Ti | −325 mesh WB | 13 μm | 1900° C. | 2 hours | 144 μm |
| G | Ti | −325 mesh W$_2$B$_5$ | 25 μm | 1900° C. | 2 hours | 154 μm |
| H | Ti | −325 mesh TaB$_2$ | 25 μm | 1900° C. | 2 hours | 145 μm |
| I | Ti | 1-5 μm TiN | 51 μm | 1900° C. | 2 hours | 154 μm |
| J | Ti | 1-5 μm ZrN | 64 μm | 1900° C. | 2 hours | 153 μm |
| K | Ti | −325 mesh Ti$_5$Si$_3$ | 229 μm | 1900° C. | 2 hours | 176 μm |
| L | Ti | 1-5 μm TiSi$_2$ | 140 μm | 1900° C. | 2 hours | 178 μm |
| M | Ti | 1-5 μm MoSi$_2$ | 165 μm | 1900° C. | 2 hours | 254 μm |
| N | Ti | −100 mesh Mo | 241 μm | 1900° C. | 2 hours | 610 μm |
| O | Ti | −325 mesh Re | 165 μm | 1900° C. | 2 hours | 165 μm |

*average particle diameter

EXAMPLE 7

The following Example demonstrates a method for forming a ceramic composite coating on a graphite substrate by applying to the surface of the graphite substrate a parent metal powder and heating the power covered graphite substrate in the presence of a metal vapor to permit the reaction between the parent metal powder, the metal vapor and the graphite substrate. Table II contains a summary for Sample P, Sample Q, and Sample R of the parent metal powder size and composition, the thickness of the parent metal coating applied to graphite substrate coupon, and the ceramic composite coating thickness formed by placing the parent metal powder coated graphite substrate coupon into the vapor deposition chamber at an elevated temperature.

The method of Example 1 was substantially repeated to prepare the Grade AXZ-SQ graphite substrate coupons for coating with a patent metal slurry and the method of Example 5 was substantially repeated to slurry coat the substrate coupons with parent metal powders and to effect formation of the ceramic composite coatings on the graphite substrate coupons.

As with the Samples in Example 5 after the graphite substrate coupons were removed from the vapor deposition chamber, the ceramic composite coated graphite substrate coupons were cut, mounted and polished for examination using optical microscopy. Fracture surfaces of the ceramic composite coatings on the graphite substrate coupons were examined in an electron microscope and x-ray diffraction analysis of the ceramic composite coatings was performed.

Figure 7A:
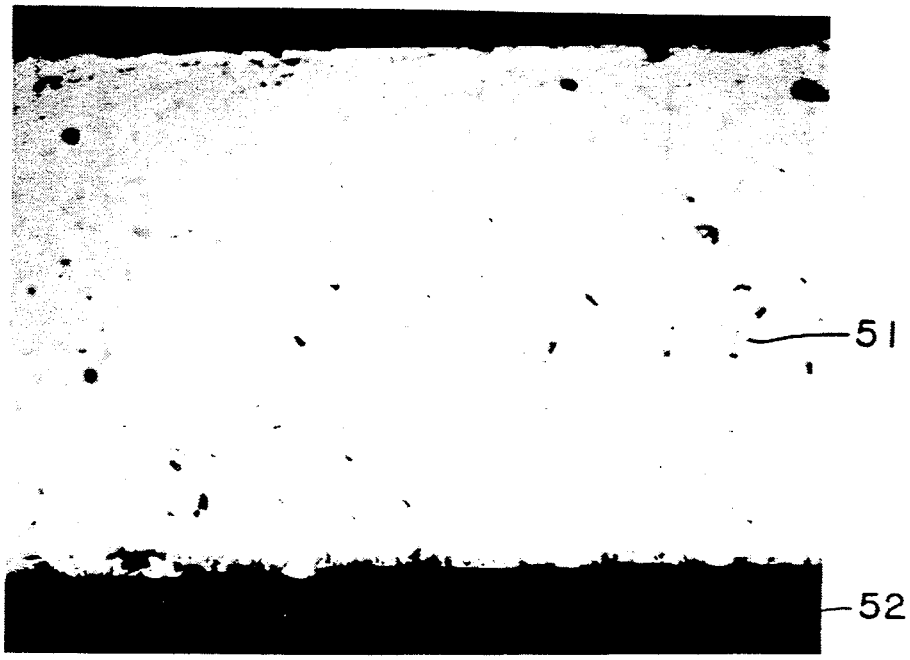
FIG. 7(a) corresponds with a photomicrograph take at 400× of a sample made in accordance with Example 7.

Specifically, FIG. 7a is a micrograph taken at about 400× of the ceramic composite coating 51 on the graphite substrate coupon 52 corresponding to Sample P. Results of x-ray diffraction analysis indicated that the constituents of the ceramic composite coating on Sample P included, among other phases, TiC.

Figure 7B:
FIGS. 7(b) and 7(c) correspond to fractographs taken at 500× and 1000×, respectively, and correspond to samples made in accordance with Example 7.

FIG. 7b is a fractograph of the ceramic composite coating 51 on the graphite substrate coupon 52 corresponding to Sample Q. Results of x-ray diffraction analysis indicated that the constituents of the ceramic composite coating on Sample Q included, among other phases, TiC, ZrC and Zr.

Figure 7C:

FIG. 7c is a fractograph taken at about 1000× of the ceramic composite coating 51 on the graphite substrate 52 corresponding to Sample R. Results of x-ray diffraction analysis indicated that the constituents of the ceramic composite coating on Sample R included, among other phases, TiC, HfC, and C.

TABLE II

| Sample | Parent Metal Vapor | Parent Metal Size & Composition | Thickness of Powder Coating | Ceramic Composite Coating Thickness |
|---|---|---|---|---|
| P | Ti | −325 mesh Ti | 432 μm | 164 μm |
| Q | Ti | −325 mesh Zr | 292 μm | 151 μm |
| R | Ti | −325 mesh Hf | 330 μm | 86 μm |

EXAMPLE 8

This Example demonstrates a method for forming a ceramic composite coating on a graphite substrate with a complicated geometry by reacting a metal vapor with the graphite substrate at an elevated temperature.

Figure 8A:
FIGS. 8(a) and 8(b) are photographs of samples made in accordance with Example 8.
Figure 8B:
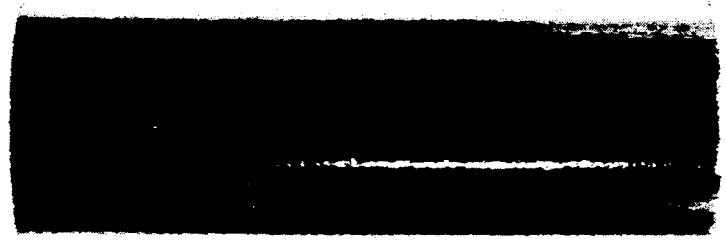

The method of Example 1 was substantially repeated except that in place of rectangular graphite substrate coupons, a threaded graphite rod measuring about 2.6 inches (66 mm) long, having an outer diameter of about 0.38 inches (9.6 mm) and 17 threads per inch, and a graphite tube measuring about 3.2 inches (81 mm) long, having a outer diameter of about 1.3 inches (33 mm) and a wall thickness of about 0.125 inch (3.2 mm) were used. The threaded graphite rod was held for about 5 hours at about 1900° C. and the graphite tube was held for about 3 hours at about 1900° C. within the vapor deposition chamber. At about room temperature, the threaded graphite rod and the graphite tube were removed from the vapor deposition chamber and it was observed that both were covered with a mirror like finish. Specifically, FIG. 8a is a photograph of the threaded graphite rod as it appeared after removal from the vapor deposition chamber and FIG. 8b is a photograph of the graphite tube as it appeared after removal from the vapor deposition chamber.

EXAMPLE 9

The following Example demonstrates a method for forming a ceramic composite coating on a carbon-carbon composite substrate by reacting a metal vapor with the carbon-carbon composite substrate at an elevated temperature. Moreover, this Example demonstrates that the ceramic composite coated carbon-carbon composite substrate can withstand extreme thermal shock conditions. The method of Example 1 was substantially repeated except that in addition to the graphite substrate coupon, a "K-CARB®" carbon-carbon composite (Kaiser Aerotech, San Leandro, Calif.) and a commercially available 4-D carbon-carbon composite were placed into the vapor deposition chamber. Additionally, the vapor deposition chamber was held for about 1 hour at about 1900° C. At about room temperature, the carbon-carbon composite and the monolithic graphite substrate coupons were removed from the lower chamber portion of vapor deposition chamber and it was noted that a mirror like finish coated the surface of the bodies.

To test the integrity of the ceramic composite coating on the 4-D carbon-carbon composite substrate, a thermal shock test was performed by subjecting the ceramic composite coated 4-D carbon-carbon composite to the flame of an acetylene torch. Specifically, the ceramic composite coated 4-D carbon-carbon composite was exposed to an acetylene flame for about 15 seconds. The temperature rise in the 15 second period was estimated to be from about room temperature to about 3500° C. After subjecting the ceramic composite coated 4-D carbon-carbon composite to the acetylene flame for about 15 seconds, the ceramic coated carbon-carbon composite was allowed to cool for about 30 seconds. The ceramic coated 4-D carbon-carbon composite was subjected to four heating and cooling cycles under the acetylene flame. After the ceramic composite coated carbon-carbon composite had cooled to about room temperature, it was noted that the ceramic coating had substantially maintained its integrity.

EXAMPLE 10

The following Example demonstrates a method for forming a ceramic composite coating on a carbon-carbon composite substrate by reacting a metal vapor with a carbon-carbon composite substrate coupon at an elevated temperature.

Figure 9:
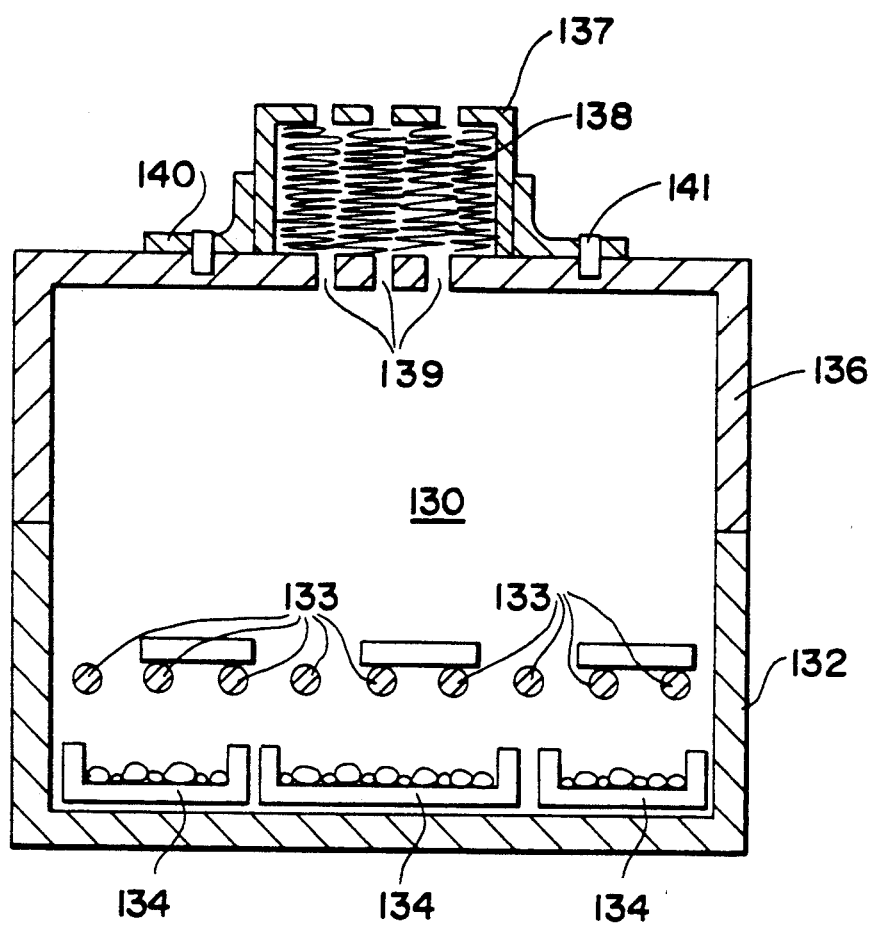
FIG. 9 is a schematic cross-sectional view of an assembly utilized to make samples in accordance with the present invention.

FIG. 9 is a cross-sectional schematic of the lay-up used to form a ceramic composite coating on carbon-carbon composite substrate coupons as well as graphite substrate coupons. Specifically, FIG. 9 is a cross-sectional schematic of a vapor deposition chamber 130 contained in a containment graphite boat. The vapor deposition chamber 130 was comprised of a lower chamber portion 132, nine substrate support rods 133, attached to the sidewalls of the lower chamber portion 132, nine graphite metal source trays 134 within lower chamber portion 132, an upper chamber portion 136, an extended portion 137 containing a graphite felt 138 and attached to upper portion chamber 136.

More specifically, the lower chamber portion 132 of the vapor deposition chamber 130 measured about 10 inches (254 mm) long, about 10 inches (254 mm) wide, and about 4 inches (102 mm) high and had a wall thickness of about 0.5 inch (13 mm). The lower chamber portion 132 was machined from a piece of grade AGSX graphite (Union Carbide Corporation, Carbon Product Division, Cleveland, Ohio). The nine graphite support rods with diameters of about 0.38 inch (9.6 mm) and made from Grade AGSX graphite (Union Carbide Corporation, Carbide Products, Division, Cleveland, Ohio), were interference fit into holes in the sidewalls of lower chamber portion 132. All of the support rods were located about 2.0 inches (51 mm) from the bottom of the lower chamber portion 132. Additionally, each of the nine support rods were located about 1 inch (25 mm), about 2 inches (51 mm), about 3 inches (76 mm), about 4 inches (102 mm), about 5 inches (127 mm), about 6 inches (152 mm), about 7 inches (178 mm), about 8 inches (203 mm), and about 9 inches (229 mm), respectively, from one sidewall of the lower chamber portion 132 and extended from one sidewall to the opposite sidewall of the lower chamber portion 132. The support rods formed a supporting means for holding the graphite substrate coupons during coating.

The upper chamber portion 136 of the vapor deposition chamber 130 measured about 10 inches (254 mm) long, about 10 inches (254 mm) wide and about 4 inches (102 mm) high and had a wall thickness of about 0.5 inch (13 mm). The upper chamber portion 136 further included 5 holes 139 having a diameter of about 0.25 inch (6.4 mm). The 5 holes 139 were substantially centrally located in the top portion of the upper chamber portion 136. The extended portion 137 measured about 3.5 inches (89 mm) long, 3.5 inches (89 mm) wide, 2 inches (51 mm) high, and had a wall thickness of about 0.25 inch (6.4 mm). The extended portion 137 was also machined from Grade AGSX graphite (Union Carbide Corporation, Carbon Product Division, Cleveland, Ohio) and was perforated with holes having a diameter of about 0.25 inch (6.4 mm) along the upper portion of the sidewalls and the top. A Grade GH graphite felt material 138 (Fiber Materials, Inc. Biddeford, Me.) was placed into the extended portion 137 of the deposition chamber 130 and the extended portion 137 of the deposition chamber 130 was aligned to the upper portion 136 of the deposition chamber 130 with angles 140 made of graphite and secured to the upper portion of the graphite chamber with graphite dowel pins 141.

The graphite metal source trays 134 were machined from Grade ATJ graphite (Union Carbide Corporation, Carbon Products Division, Cleveland, Ohio). The graphite metal source trays 134 measured about 2.5 inches (64 mm) long, 2.5 inches (64 mm) wide, 1 inch (25 mm) high and had a wall thickness of about 0.25 inch (6.4 mm). The graphite metal source trays 104 were evenly placed in the space in the bottom of the lower chamber portion. All of the graphite metal source trays were filled with −5 mesh, +20 mesh (particle diameter between about 850 μm and 4000 μm) titanium, metal sponge (Micron Metals, Inc., Salt Lake City, Utah) to a depth ranging from about 0.25 inch (6.4 mm) to about 0.38 inch (9.7 mm).

A piece of Grade AXZ-5Q graphite material (Poco Graphite, Inc., Decatur, Tex.) measuring about 1 inch (25 mm) long, bout 1 inch (25 mm) wide and about 0.2 inch (5.1 mm) thick was sanded with 400 grit (average particle diameter of about 23 μm) silicon carbide paper to smooth the edges and then with 1200 grit (average particle size of about 4 μm) silicon carbide paper to smooth all surfaces. The sanded graphite substrate coupon was then cleaned for about 15 minutes in an ultrasonically agitated bath of acetone and dried in an air oven set at about 120° C. for about 0.45 hours. After drying substantially completely, the graphite substrate coupon was placed on support rods 133 within the lower chamber portion 132. The same procedure was repeated with a piece of "K-CARB ®" carbon-carbon composite (Kaiser Aerotech, San Leandro, Calif.) and a commercially available 4-D carbon-carbon composite. After the carbon-carbon composite components had dried for about 0.5 hours at about 120° C., carbon-carbon composite coupons were placed on the graphite support rods 133 within the lower chamber portion 132 of the vapor deposition chamber 130.

The upper portion 136 of the vapor deposition chamber 130 was placed onto and aligned with the lower chamber portion 132 of the deposition chamber 132. The vapor deposition chamber 130 and its contents were then placed into a vacuum furnace and the vacuum furnace door was closed. The vacuum furnace was then evacuated to about 0.2 millitorr. After about 50 minutes at about 0.2 millitorr, the vacuum furnace and its contents were heated to about 500° C. at about 250° C. per hour while maintaining a vacuum less than about 60 millitorr. The vacuum furnace was then heated from about 500° C. to about 1000° C. at about 750° C. per hour while maintaining a vacuum less than about 60 millitorr. At about 1000° C., the vacuum within the vacuum furnace was allowed to increase to between about 60 millitorr and about 250 millitorr and the vacuum furnace and its contents were heated from about 1000° to about 1900° C. at about 750° C. per hour. After about 2 hours at about 1900° C., with a vacuum ranging from about 60 millitorr to about 250 millitorr, the vacuum furnace and its contents were cooled at about 900° C. per hour to about 1000° C. while maintaining a vacuum ranging from about 60 millitorr to about 250 millitorr. The vacuum furnace and its contents were then cooled from about 1000° C. to about room temperature at about 125° C. per hour while maintaining a vacuum ranging from about 60 millitorr to about 250 millitorr.

Figure 10A:
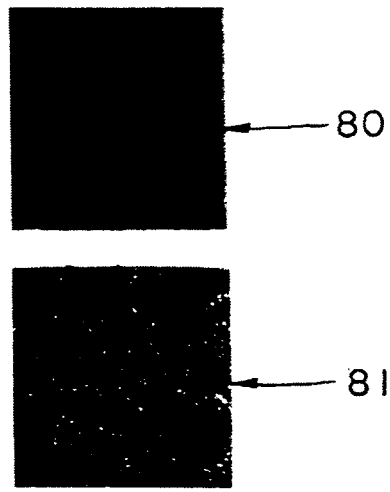
FIGS. 10(a), 10(b) and 10(c) are before and after views of samples treated in accordance with the present invention.
Figure 10B:
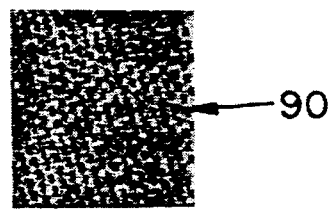
Figure 10B:
Figure 10C:
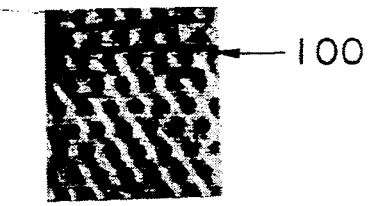
Figure 10C:
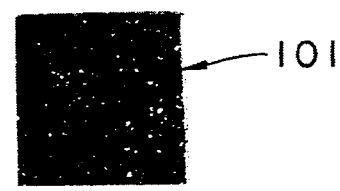

At about room temperature, the vacuum furnace door was opened, the vapor deposition chamber 130 was removed from the furnace, disassembled and the carbon-carbon composite and the monolithic graphite substrate coupons were removed from the lower chamber portion 132 of the vapor position chamber 130. It was noted that a mirror like finish coated the surface of the substrate coupons. Specifically, FIG. 10a is a comparison of the graphite substrate coupon 80 and the ceramic composite coated graphite coupon 81 showing the change in appearance resulting from the coating process. FIG. 10b is a photograph showing a comparison of the "K-CARB ®" carbon-carbon composite coupon 90 and the ceramic coated "K-CARB ®" carbon-carbon composite coupon 91 showing the change in appearance resulting from the coating process. FIG. 10c is a photograph showing a comparison of the 4-D carbon-carbon composite coupon 100 and the ceramic composite coated 4-D carbon-carbon composite coupon 101 showing the change in appearance resulting from the coating process.

EXAMPLE 11

The following Example demonstrates a method for forming a ceramic composite coating on a graphite substrate by applying to the surface of a graphite substrate an additive powder and heating the powder covered substrate in the presence of a metal vapor to permit the incorporation of the additive powder in a ceramic composite coating formed by the reaction between the metal vapor and the graphite substrate.

Table III contains a summary for Sample S through Sample Z of the additive powder size and composition, the thickness of the additive powder coating, the processing temperature to effect the formation of the ceramic composite coating, the processing time to effect the formation of the ceramic composite coating, and the thickness of the ceramic composite coating on a graphite substrate coupon.

Specifically, the composition of the additive powders applied to the surface of the graphite substrate as slurries included: Grade E67 1000 grit (average particle diameter of about 5 μm), alumina (Norton Company, Worcester, Mass.), light powder magnesium oxide (Fisher Scientific, Pittsburgh, Pa.), 1-5 μm particle diameter titanium dioxide (Atlantic Equipment Engineers, Bergenfield, N.J.), Grade MSZ zirconium dioxide (Magnesium Electron, Inc., Flemington, N.J.), −325 mesh (particle diameter less than about 45 μm) magnesium aluminate spinel (Atlantic Equipment Engineers, Bergenfield, N.J.), −325 mesh (particle diameter less than about 45 μm) silicon dioxide (Consolidated Astronautics, Inc., Saddle Brook, N.J.), tungsten dioxide (Alfa Products, Morton Thiokol, Inc., Danvers, Mass.), molybdenum trioxide (AESAR ®, Johnson Matthey, Seabrook, N.H.). The method of Example 1 was substantially repeated to prepare the graphite substrate coupons for slurry coating. The method of Example 10 was substantially repeated for Sample S through Sample Z in order to effect the formation of the ceramic composite coating on the graphite substrate coupons.

Figure 11A:
FIG. 11(a), 11(b), 11(c), 11(d) and 11(e) correspond to fractographs taken at various magnifications (specified in specification) of samples made in accordance with Example 11.

Fracture surfaces of the ceramic composite coatings on the graphite substrate coupons were examined using an electron microscope. Specifically, FIG. 11a is a fractograph taken at about 500× of the ceramic composite coating 51 on the graphite substrate coupon 52 corresponding to Sample S.

Figure 11B:

FIG. 11b is a fractograph taken at about 200× of the ceramic composite coating 51 on the graphite substrate coupon 52 corresponding to Sample T.

Figure 11C:
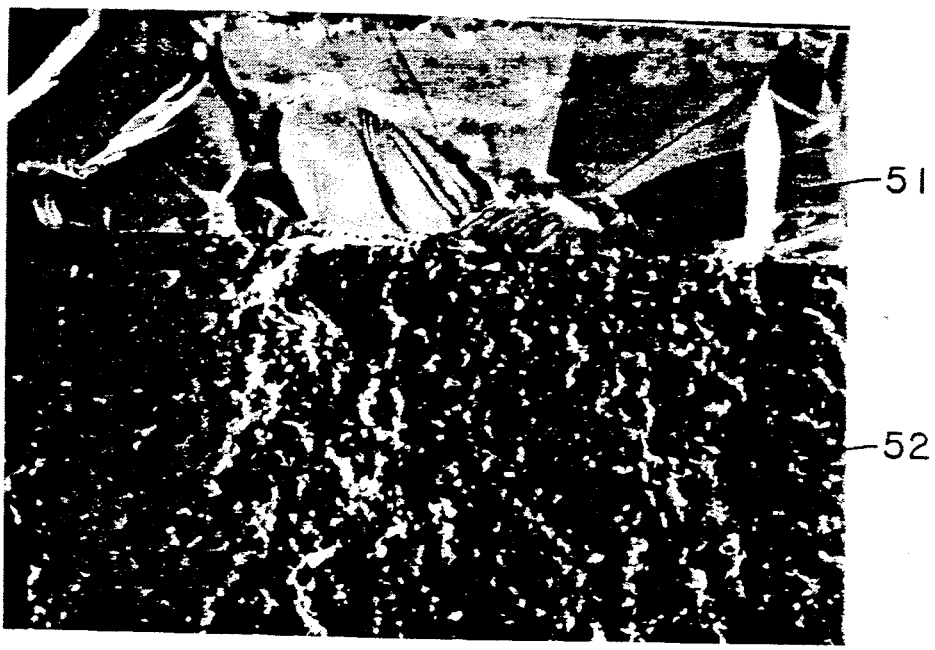

FIG. 11c is a fractograph taken at about 200× of the ceramic composite coating 51 on the graphite substrate coupon 52 corresponding to Sample X.

Figure 11D:
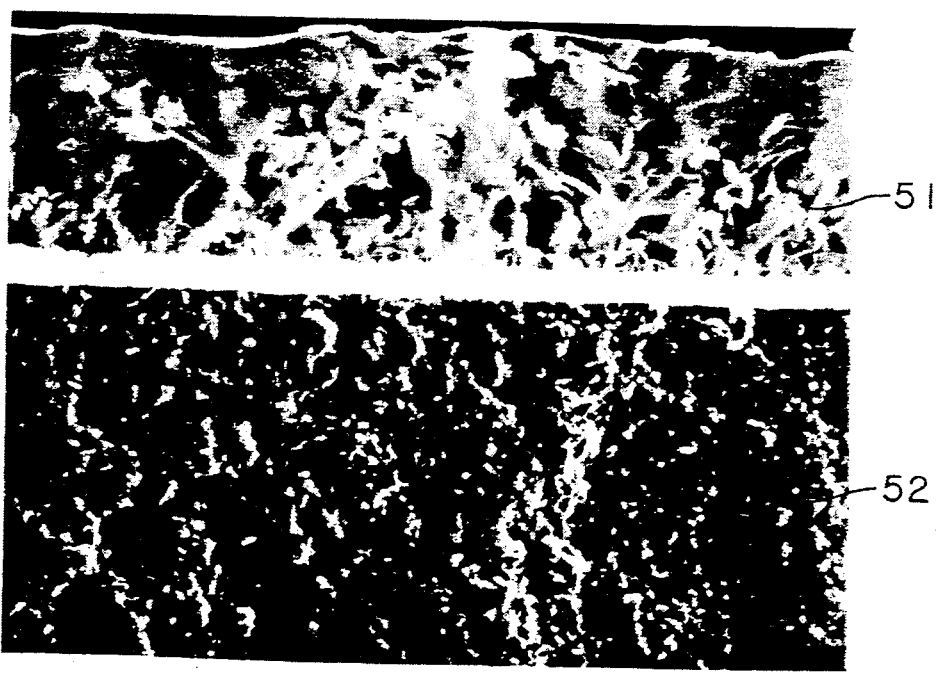

FIG. 11d is a fractograph taken at about 200× of the ceramic composite coating 51 on the graphite substrate coupon 52 corresponding to Sample Y.

Figure 11E:
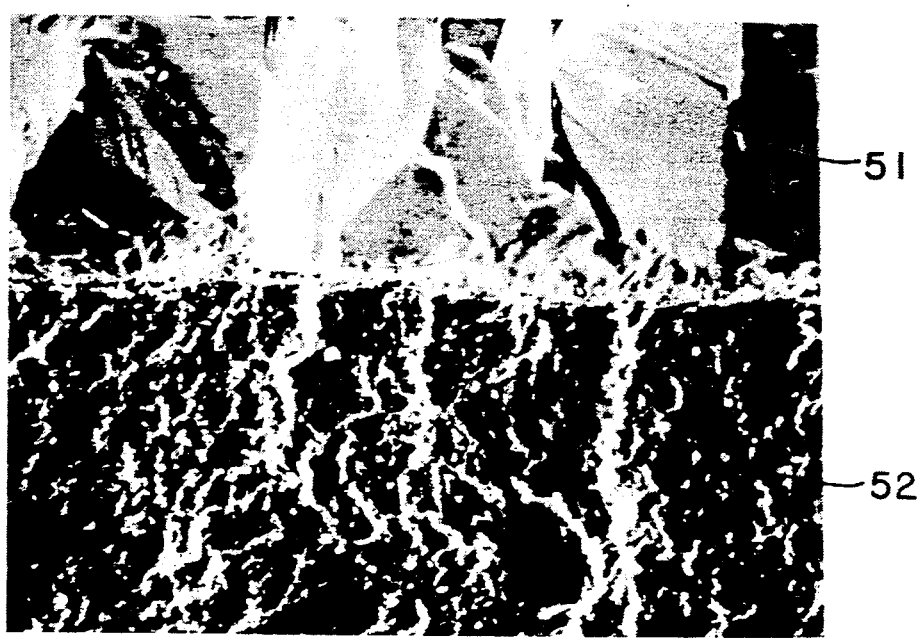

FIG. 11e is a fractograph taken at about 200× of the ceramic composite coating 51 on the graphite substrate 52 corresponding to Sample Z.

EXAMPLE 12

The following Example demonstrates a method for forming a ceramic composite body by heating a graphite material in the presence of a metal vapor to permit a reaction between the metal vapor and the graphite material.

VACITE ®" 2045 acrylic resin (E. I. du Pont de Nemours & Co., Inc., Wilmington, Del.), 0.1% n-butyl phthalate (Fischer Scientific Company, Pittsburgh, Pa.), 33.4% ethylene glycol monobutyl ether (Textile Chemical Company, Reading, Pa.), and about 27.3% isopropyl alcohol was made in a plastic jar. All the components of the suspension, except for the boron powder, were combined to make a solution. After all the components had substantially completely dissolved to make a homogeneous solution, the boron powder was added. The plastic jar was placed in a shaker mixer for about 15 minutes, then on a roller mixer for at least 2 hours and finally placed into an ultrasonically agitated bath to break apart any remaining agglomerates of boron powder and complete the formation of the boron suspension. The boron suspension was poured into a dish. The carbon fiber thermal insulation was then submerged into the boron suspension to initiate the impregnation with the boron powder. Once the carbon fiber thermal insulation remained submerged below the surface of the boron suspension, the dish and its contents were moved to a vacuum chamber. After the vacuum chamber was closed, the vacuum chamber was evacuated to effect the evaporation of a portion of the solvents from the boron suspension. air was then reintroduced into the vacuum chamber. The cycles of evacuation and reintroduction of air were continued until substantially all the solvents had evaporated and a boron powder impregnated carbon fiber thermal insulation remained. Sample AD and AE were "CALCARB ®" rigid carbon fiber thermal insulation measuring about

TABLE III

| Sample | Parent Metal Vapor | Additive Powder Size & Composition | Thickness of Powder Coating | Processing Temperature | Processing Time at Processing Temperature | Ceramic Composite Coating Thickness |
|---|---|---|---|---|---|---|
| S | Ti | 1000 grit Al$_2$O$_3$ | 229 μm | 1900° C. | 2 hours | 157 μm |
| T | Ti | MgO | 305 μm | 1900° C. | 2 hours | 165 μm |
| U | Ti | 1-5 μm TiO$_2$ | 102 μm | 1900° C. | 2 hours | 178 μm |
| V | Ti | ArO$_2$ | 102 μm | 1900° C. | 2 hours | 166 μm |
| W | Ti | −325 mesh MgAl$_2$O$_4$ | 229 μm | 1900° C. | 2 hours | 152-174 μm |
| X | Ti | −325 mesh SiO$_2$ | 305 μm | 1900° C. | 2 hours | 172 μm |
| Y | Ti | WO$_2$ | 216 μm | 1900° C. | 2 hours | 174 μm |
| Z | Ti | MoO$_3$ | 330 μm | 1900° C. | 2 hours | 163 μm |

Table IV contains summary for Sample AA through Sample AE of the substrate material, the metal vapor, the additive powder size and composition, the processing temperature and the processing time at the processing temperature for the formation of the ceramic composite materials by the instant invention. Sample AA was "MAGNAMITE ®" 5 harness satin weave (HSW) graphite cloth (Hercules Aerospace, Magua, Utah) measuring about 1 inch (25 mm) long, 1 inch (25 mm) wide and about 0.12 inch (3 mm) thick. Sample AB was "THORNEL ®" Grade VMA graphite mat (Amoco Performance Products, Inc., Greenville, S.C.) measuring about 1.6 inches (41 mm) long, about 1.6 inches (41 mm) wide and about 1 inch (25 mm) thick. Sample AC was "CALCARB ®" rigid carbon fiber thermal insulation (Calcarb Inc., Willingboro, N.J.) measuring about 2.4 inches (61 mm) long, about 2.4 inches (61 mm) wide and about 0.05 inch (1.3 mm) thick. The carbon fiber thermal insulation had been impregnated with about 1.14 grams of submicron boron powder (Callery Chemical Co., Callery, Pa.) using a vacuum impregnation technique. Specifically, a suspension comprised by weight of about 27.6% submicron boron powder (Callery Chemical Company, Callery, Pa.), 11.6% "EL- 1.6 inches (41 mm) long, 1.5 inches (38 mm) wide and about 1.3 inches thick. Sample AE was impregnated with about 0.83 grams of submicron boron powder (Callery Chemical Co., Callery, Pa.) using the above-described vacuum impregnation technique.

Figure 12:
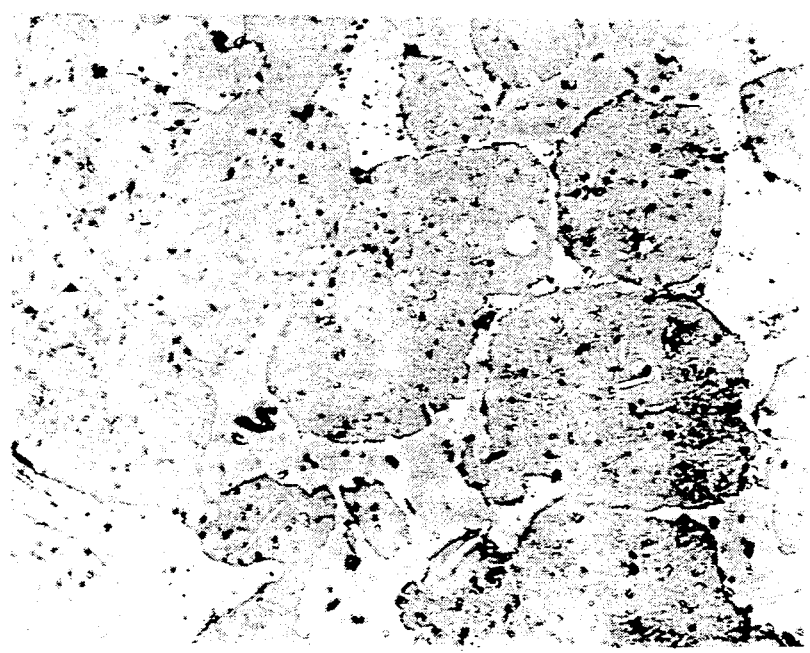
FIG. 12 is a photomicrograph taken at 400× of the microstructure of a sample made in accordance with Example 12.

The method of Example 10 was substantially repeated to effect the formation of the ceramic composite materials with the exception that Sample AC was held at 1900° C. for about 6 hours. At about room temperature, the vapor deposition chamber was disassembled and the graphite materials were removed from the bottom portion of the vapor deposition chamber to reveal that the titanium metal vapor had reacted with the graphite materials to form highly reflective bodies. Additionally, results of x-ray diffraction analysis indicated that the constituents of Sample AC comprised, among other phases, titanium carbide, titanium and titanium boride. FIG. 12 is a photomicrograph taken at about 400× corresponding to the ceramic composite body of Sample AC.

EXAMPLE 13

The following Example demonstrates a method for using a graphite body that has been coated with a ceramic composite coating by subjecting it to a vapor parent metal source.

Figure 13:
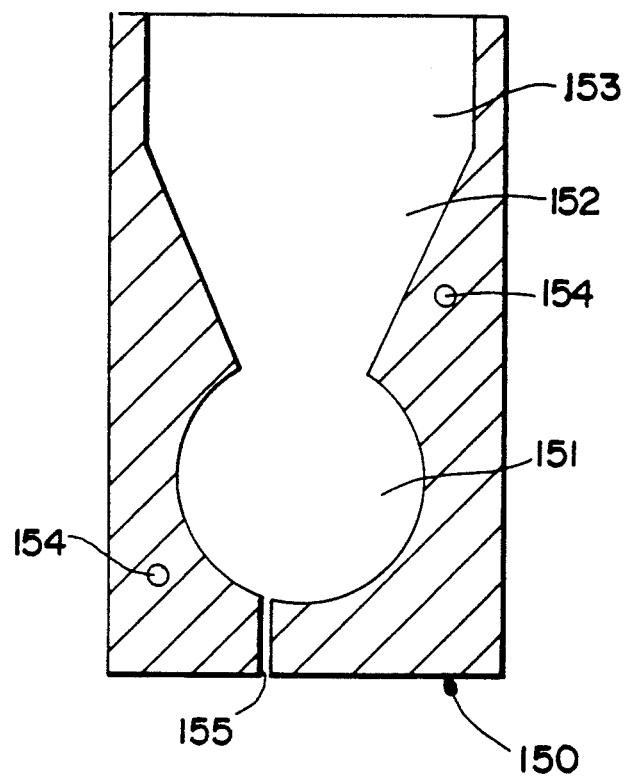
FIG. 13 is a perspective view of a mold piece utilized in accordance with Example 13.

A two-piece mold was used to make spherical platelet reinforced composite bodies. FIG. 13 is a side view schematic of one piece of the two-piece mold. The halves of the two piece split mold were machined from Grade ATJ graphite (Union Carbide Corporation, Carbon Products Division, Cleveland, Ohio). The two-piece mold had an outer diameter of about 2.25 inches (57 mm), a height of about 3.7 inches (94 mm) and a complex inner cavity. The inner cavity was comprised of a cylindrical void 153 having a diameter of about 1.9 inches (48 mm) and a height of about 0.75 inch (1.9 mm), a frustro-conical void 152 having a large diameter of about 1.9 inches (48 mm), a small diameter of about 0.7 inch (1.8 mm) and a height of about 1.2 inches (30 mm), and a spherical void 151 having a diameter of about 1.4 inches (36 mm). The cylindrical void 153, the frustro-conical void 152, and the spherical void 151 were aligned with the axis symmetry of the two-piece mold. Two grooves 155 (one shown in FIG. 13), measuring about 0.031 inch (0.79 mm) wide and extending from the bottom of the two-piece mold to the spherical void portion of the two-piece mold were located at about 0.13 inch from the axis symmetry of the two-piece molds.

Each half of the two-piece mold also had two alignment holes 154 for receiving graphite rods having a diameter of about 1.3 inches and a length of about 1.1 inches.

A vapor deposition chamber substantially the same as that in Example 1 was used. Four assembled two-piece molds were placed into the lower portion of a vapor deposition chamber. The large opening of the two-piece molds contacted the support rods and had a line of sight to the metal source trays. The metal source trays within the vapor deposition chamber were filled with a nuclear grade zirconium sponge material (Western Zirconium, Ogden, Utah), weighing about 75 grams. The upper portion of the vapor deposition chamber was aligned with the lower portion of the vapor deposition chamber and the vapor deposition chamber was placed onto a catch tray to form a lay-up. The lay-up and its contents were then placed into a vacuum furnace and the vacuum furnace door was closed. The vacuum furnace was then evacuated to about 0.2 millitorr. After about 50 minutes at about 0.2 millitorr, the vacuum furnace and its contents were heated to about 1000° C. at about 750° C. per hour. At about 1000° C., the vacuum within the vacuum furnace was allowed to increase to between about 60 millitorr to about 250 millitorr and the vacuum furnace and its contents were heated from about 1000° C. to about 2000° C. at about 750° C. per hour. After about 5 hours at about 2000° C. with a vacuum ranging from about 60 millitorr to about 250 millitorr, the vacuum furnace and its contents were cooled to about 1000° C. at about 1000° C. per hour and then from a 1000° C. to about room temperature at about 125° C. per hour while maintaining a vacuum ranging from about 60 millitorr to about 250 millitorr. At about room temperature, the vacuum furnace door was opened and the vapor deposition chamber was disassembled to reveal that the surface of two piece mold had been coated by the deposition process.

The spherical cavity of the two-piece molds were then coated with "TETRABOR®" 1000 grit boron carbide (ESK Engineered Ceramics, New Canaan, Conn.). The coated two-piece molds were then tapped about 700 times using a tap volume meter (Model 2003 stampvolumeter, J. Englesmann, A.G., West Germany) to settle the boron carbide. A parent metal ingot designated zirconium alloy 705, having a composition by weight of about ≦4.5% Hf, ≦0.2 Fe and Cu, ≦0.002% H, ≦0.025% N, ≦0.05% C, 2.0–3.0% Nb, ≦0.18% O and a minimum of 95.5% Zr and Hf, was placed onto the tap loaded boron carbide powder. Several such setups were placed into a graphite containment boat to form a lay-up. The lay-up and its contents were placed into a vacuum furnace and the vacuum furnace door was closed. The vacuum chamber was then evacuated to about 9×10−4 torr and then heated from about room temperature to about 1600° C. at about 600° C. per hour. At about 1600° C., the vacuum was allowed to increase to about 60 to 250 millitorr while the furnace was heated from about 1600° C. to about 2000° C. at about 600° C. per hour. After about 30 minutes at about 2000° C. per hour, the vacuum pump to the furnace chamber was interrupted and argon was introduced into the chamber at a flow rate of about 10 liters per minute until an over pressure of about 2 lbs per square inch was achieved The argon flow rate was then reduced to 2 liters per minute. After about 2 hours at about 2000° C. while maintaining an argon flow rate of about 2 liters per minute with an over pressure of about 2 lbs per square inch, the furnace and its contents were allowed to cool from about 2000° C. to about room temperature at about 800° C. per hour. At about room temperature, the lay-up was removed from the furnace and it was noted that composite bodies had formed by the reactive infiltration of the zirconium parent metal alloy into the boron carbide powder and that the resultant ceramic composite bodies were easily removed from the coated two piece graphite molds.

A second group of four two-piece molds that had not been subjected to the metal vapor treatment were filled with the boron carbide powder and supplied with the zirconium parent metal alloy as described above. The filled two piece molds were placed onto a graphite

TABLE IV

| Sample | Substrate Material | Parent Metal Vapor | Additive Powder Size & Composition | Processing Temperature | Processing Time at Processing Temperature |
|---|---|---|---|---|---|
| AA | 5 HSW graphite fiber cloth | Ti | none | 1900° C. | 2 hours |
| AB | graphite mat | Ti | none | 1900° C. | 2 hours |
| AC | carbon fiber insulation | Ti | submicron boron | 1900° C. | 6 hours |
| AD | carbon fiber insulation | Ti | none | 1900° C. | 2 hours |
| AE | carbon fiber insulation | Ti | submicron boron | 1900° C. | 2 hours | containment tray and into a vacuum furnace. The uncoated two piece molds were subjected to substantially the same processing cycle as the coated two piece molds, except that the furnace and its contents were cooled from about 2000° C. to about room temperature at about 600° C. per hour. At about room temperature, the two piece graphite molds were disassembled to reveal that the parent metal had preferentially reacted with the graphite mold and wet the inner surface of the graphite mold and leaked through the vents 155 within the graphite mold and minimized the amount of reaction between the boron carbide and the zirconium parent metal. Thus, this Example demonstrates that the precoating of a graphite mold by subjecting it to a vapor parent metal to form a coating on the mold improves the ability to make dense ceramic composite bodies.

What is claimed is:

1. A method for forming a self-supporting body comprising:
   providing a solid oxidant-containing material;
   providing at least one filler on at least a portion of said solid oxidant-containing material;
   contacting at least one vapor-phase parent metal with at least a portion of said solid oxidant-containing material; and
   causing said at least one vapor-phase parent metal and at least a portion of said solid oxidant-containing material to form at least one reaction product on at least a portion of at least one surface of said solid oxidant-containing material, wherein said at least one reaction product embeds at least a portion of said at least one filler.

2. The method of claim 1, wherein said at least one vapor-phase parent metal comprises at least one metal selected from the group consisting of titanium, zirconium and hafnium.

3. The method of claim 1, wherein said solid oxidant-containing material comprises a carbonaceous material.

4. The method of claim 1, wherein said at least one reaction product is formed as a coating on substantially all surfaces of said solid oxidant-containing material.

5. The method of claim 1, wherein said solid oxidant-containing material comprises a coating on at least one surface of a substrate material.

6. The method of claim 5, wherein said coating is located on substantially all surfaces of said substrate material.

7. The method of claim 1, wherein said at least one filler comprises at least one material selected from the group consisting of TiC, TiB$_2$, SiB$_4$, SiB$_6$, HfB$_2$, WB, W$_2$B$_5$, TaB$_2$, TiN, ZrN, Ti$_5$Si$_3$, TiSi$_2$, MoSi$_2$, Mo, and Re.

8. The method of claim 1, wherein said at least one filler comprises at least one material selected from the group consisting of Al$_2$O$_3$, MgO, TiO$_2$, ZrO$_2$, MgAl$_2$O$_4$, SiO$_2$, WO$_2$, and MoO$_3$.

9. The method of claim 1, wherein said solid oxidant-containing material is substantially completely converted to reaction product.

10. The method of claim 1, wherein said solid oxidant-containing material comprises a material having a complex geometry.

11. The method of claim 1, wherein said solid oxidant-containing material comprises a carbon-carbon substrate.

12. The method of claim 1, wherein at least two vapor-phase parent metals are utilized.

13. A method for forming a self-supporting body comprising:
    providing a first solid oxidant-containing material;
    placing at least one different solid oxidant-containing material on at least a portion of said first solid oxidant-containing material;
    contacting at least one vapor-phase parent metal with at least a portion of said first solid oxidant-containing material and said different solid oxidant-containing material; and
    causing said at least one vapor-phase parent metal and at least said first solid oxidant-containing material to form at least one reaction product on at least a portion of at least one surface of at least said first solid oxidant-containing material, wherein said at least one reaction product includes at least a portion of said at least one different solid oxidant-containing material or at least one different reaction product formed from said at least one different solid oxidant-containing material.

14. The method of claim 13, wherein said at least one vapor-phase parent metal reacts with both of said first solid oxidant-containing material and said at least one different solid oxidant-containing material to form at least two reaction products.

15. The method of claim 14, wherein said reaction products are substantially similar.

16. The method of claim 14, wherein said reaction products are substantially different.

17. The method of claim 13, wherein a first reaction product is formed from a reaction between said vapor-phase parent metal and said first solid oxidant-containing material and a second reaction product is formed from a reaction between said vapor-phase parent metal and said at least one different solid oxidant-containing material.

18. The method of claim 13, wherein said at least one different solid oxidant-containing material is coated onto said first solid oxidant-containing material.

19. The method of claim 13, wherein said at least one different solid oxidant-containing material comprises at least one of boron or boron carbide.

20. The method of claim 1, wherein said reaction product is formed primarily as a coating on at least one surface of said solid oxidant-containing material, and said coating comprises a relatively thin layer or a relatively thick layer.

21. The method of claim 4, wherein said coating comprises a relatively thin layer or a relatively thick layer.

22. The method of claim 19, wherein said reaction product comprises at least one material selected from the group consisting of titanium carbide, zirconium carbide, titanium diboride, hafnium carbide, niobium carbide, molybdenum disilicide, hafnium diboride and zirconium diboride.

23. A method for forming a self-supporting body comprising:
    providing a first solid oxidant-containing material;
    coating at least a portion of said first solid oxidant-containing material with at least one material selected from the group consisting of at least one parent metal powder and at least one different solid oxidant-containing material;
    contacting at least a portion of said coated first said solid oxidant-containing material with a parent metal vapor; and causing said parent metal vapor to react to form at least one reaction product on at least a portion of at least one surface of said first solid oxidant-containing material, wherein said at least one reaction product includes at least a portion of at least one material selected from the group consisting of said at least one powdered parent metal, said at least one different solid oxidant-containing material and at least one different oxidation reaction product formed from said at least one powdered parent metal or said at least one different solid oxidant-containing material.

24. The method of claim 23, wherein said powdered parent metal has a chemical composition which is different from a chemical composition of said vapor-phase parent metal.

25. The method of claim 24, wherein said first solid oxidant-containing material forms a first reaction product with said powdered parent metal and a second reaction product with said vapor-phase parent metal.

26. The method of claim 24, wherein said powdered parent metal and said vapor-phase parent metal comprise substantially similar chemical compositions.

27. The method of claim 24, wherein said powdered parent metal comprises at least one metal selected from the group consisting of titanium, zirconium, hafnium, silicon and niobium and said vapor-phase parent metal comprises at least one different material selected from the group consisting of titanium, zirconium, hafnium, silicon and niobium.

* * * * *